United States Patent
Gemmeke et al.

(10) Patent No.: US 10,573,304 B2
(45) Date of Patent: Feb. 25, 2020

(54) SPEECH RECOGNITION SYSTEM AND METHOD USING AN ADAPTIVE INCREMENTAL LEARNING APPROACH

(71) Applicant: KATHOLIEKE UNIVERSITEIT LEUVEN, Leuven (BE)

(72) Inventors: Jort Gemmeke, Sunnyvale, CA (US); Bart Ons, Veltem-Beisem (BE); Hugo Van Hamme, Vilvoorde (BE)

(73) Assignee: KATHOLIEKE UNIVERSITEIT LEUVEN, Leuven (BE)

( * ) Notice: Subject to any disclaimer, the term of this patent is extended or adjusted under 35 U.S.C. 154(b) by 0 days.

(21) Appl. No.: 15/577,337

(22) PCT Filed: Nov. 4, 2015

(86) PCT No.: PCT/EP2015/075721
§ 371 (c)(1),
(2) Date: Nov. 27, 2017

(87) PCT Pub. No.: WO2016/188593
PCT Pub. Date: Dec. 1, 2016

(65) Prior Publication Data
US 2018/0151177 A1    May 31, 2018

Related U.S. Application Data

(60) Provisional application No. 62/166,585, filed on May 26, 2015.

(51) Int. Cl.
*G10L 15/28* (2013.01)
*G10L 15/22* (2006.01)
*G10L 15/065* (2013.01)
*G10L 15/16* (2006.01)
*G10L 15/18* (2013.01)

(52) U.S. Cl.
CPC ............ *G10L 15/22* (2013.01); *G10L 15/065* (2013.01); *G10L 15/16* (2013.01); *G10L 15/1815* (2013.01); *G10L 2015/223* (2013.01)

(58) Field of Classification Search
CPC ..... G10L 21/028; G10L 15/02; G10L 15/063; G10L 15/14; G10L 15/16; G10L 15/18; G10L 15/22; G10L 17/005; G10L 17/04; G10L 17/06; G10L 21/0232; G10L 21/0272; G10L 21/0308; G10L 25/21;
(Continued)

(56) References Cited

U.S. PATENT DOCUMENTS 9,582,762 B1 *  2/2017  Cosic .................. G06N 5/04
9,600,231 B1 *  3/2017  Sun .................... G06F 3/167
(Continued)

OTHER PUBLICATIONS

Ons, Bart et al., ("Fast vocabulary acquisition in an NMF-based self-learning vocal user interface", Computer Speech and Language, vol. 28, No. 4, pp. 997-1017). (Year: 2013).*
(Continued)

*Primary Examiner* — Vijay B Chawan
(74) *Attorney, Agent, or Firm* — Straub & Straub; Michael P. Straub; Stephen T. Straub

(57) ABSTRACT

The present disclosure relates to speech recognition systems and methods using an adaptive incremental learning approach. More specifically, the present disclosure relates to adaptive incremental learning in a self-taught vocal user interface.

21 Claims, 9 Drawing Sheets

(58) Field of Classification Search
CPC ........ G10L 25/30; G06N 20/00; G06N 3/006; G06N 3/02; G06N 5/04; H04N 7/157
USPC ....... 704/236, 253, 252, 232, 220, 244, 255, 704/257, 270, 240; 706/25
See application file for complete search history.

(56) References Cited

U.S. PATENT DOCUMENTS

| | | | |
|---|---|---|---|
| 10,192,568 B2* | 1/2019 | Wang | G10L 25/21 |
| 2016/0071526 A1* | 3/2016 | Wingate | G10L 21/028 704/233 |
| 2017/0178664 A1* | 6/2017 | Wingate | G10L 21/028 |
| 2018/0286409 A1* | 10/2018 | Baughman | G10L 17/06 |

OTHER PUBLICATIONS

Jen-Tzung, Chien et al., ("Adaptive Bayesian Latent Semantic Analysis", IEEE Transactions on Audio, Speech and Language Processing, vol. 16, No. 1, Jan. 1, 2008, pp. 198-207, Jan. 2008). (Year: 2008).*

Driesen et al., ("Modelling vocabulary acquisition, adaptation and generalization in infants using adaptive Bayesian PLSA", Neurocomputing, vol. 74, No. 11 , pp. 1874-1882, Jul. 2010). (Year: 2010).*

Ons, Bart et al., ("NMF-based keyword learning from scarce data", 2013 IEEE Workshop on Automatic Speech Recognition and Understanding, IEEE, Dec. 8, 2013 (Dec. 8, 2013), pp. 392-397). (Year: 2013).*

G. Hinton et al, "Deep Neural Networks for Acoustic Modeling in Speech Recognition", IEEE Signal Processing Magazine, vol. 29, nr. 6, pp. 82-97, Nov. 2012.

J.F. Gemmeke et al, "Self-taught assistive vocal interfaces: An overview of the ALADIN project", Proceedings of Interspeech (2013).

J. Driesen, "Discovering words in speech using matrix factorization", PhD Dissertation, KU Leuven, ESAT, Jul. 2012.

J. F. Gemmeke et al, "Dysarthric vocal interfaces with minimal training data", Spoken Language Technology Workshop (SLT) (2014).

M. S. Hawley et al, "A speech-controlled environmental control system for people with severe dysarthria", Medical Engineering & Physics, vol. 29, nr. 5, p. 586-593, Elsevier (2007).

M. S. Hawley et al, "A voice-input voice-output communication aid for people with severe speech impairment", Neural Systems and Rehabilitation Engineering, IEEE Transactions on, vol. 21, No. 1, p. 23-31 (2013).

Z. Xianglilan et al, "One-against-All Weighted Dynamic Time Warping for Language-Independent and Speaker-Dependent Speech Recognition in Adverse Conditions", PLOS ONE, vol. 9, No. 2, p. e85458, Feb. 2014.

W. H. Abdulla et al, "Cross-words reference template for DTW-based speech recognition systems", in TENCON 2003. Conference on Convergent Technologies for the Asia-Pacific Region, vol. 4, IEEE, p. 1576-1579, (2003).

L. Broekx et al, "Comparing and combining classifiers for self-taught vocal interfaces", Proc SLPAT, p. 21-28, Grenoble, France (2013).

B. Ons et al, "The self-taught vocal interface", EURASIP Journal on Audio, Speech, and Music Processing, vol. 2014, No. 1, p. 43 (2014).

V. Roy et al., "A Framework for Adaptation of the Active-DTW Classifier for Online Handwritten Character Recognition" 10th International Conference on Document Analysis and Recognition, ICDAR '09, p. 401-405, (2009).

M. Matassoni et al, "The dirha-grid corpus: baseline and tools for multi-room distant speech recognition using distributed microphones", Fifteenth Annual Conference of the International Speech Communication Association, (2014).

B. Lecouteux et al, "Distant speech recognition in a smart home: Comparison of several multisource ASRs in realistic conditions", Proc. Interspeech, p. 2273-2276 (2011).

H. Christensen et al, "HomeService: Voice-enabled assistive technology in the home using cloud-based automatic speech recognition", Proc. SLPAT, p. 29-34, Grenoble, France (2013).

H. Van hamme, "HAC-models: a Novel Approach to Continuous Speech Recognition", Proc. Interspeech, Brisbane, Australia, p. 255-258 (2008).

J. Driesen et al, "Adaptive non-negative matrix factorization in a computational model of language acquisition", Proc. Interspeech, Brighton, UK, p. 1731-1734 (2009).

J. Driesen et al, "Modelling vocabulary acquisition, adaptation, and generalization in infants using adaptive Bayesian PLSA", Neurocomputing, vol. 74, p. 1874-1882 (2011).

M. Shashanka et al, "Probabilistic latent variable models as non-negative factorizations", Computational intelligence and neuroscience, vol. 2008, Hindawi Publishing Corporation (2008).

J.-L. Gauvain et al, "Maximum a posteriori estimation for multivariate Gaussian mixture observations of Markov chains", Speech and audio processing, IEEE transactions on, vol. 2, nr. 2, p. 291-298, IEEE (1994).

A. P. Dempster et al, "Maximum likelihood from incomplete data via the EM algorithm", Journal of the Royal Statistical Society. Series B (Methodological), p. 1-38 (1977).

T. Hofmann, "Probabilistic latent semantic analysis", Proceedings of the Fifteenth conference on Uncertainty in artificial intelligence, p. 289-296, Morgan Kaufmann Publishers Inc. (1999).

B. Ons et al, "A Self Learning Vocal Interface for Speech-impaired Users", in SLPAT 2013, pp. 73-81 (2013).

C. Middag, "Automatic Analysis of Pathological Speech", PhD Dissertation, Ghent University, Belgium (2012).

M. Ferrarons et al, "Flexible Stand-Alone Keyword Recognition Application Using Dynamic Time Warping", Advances in Speech and Language Technologies for Iberian Languages, p. 158-167, Springer (2014).

N. Oostdijk, "The Spoken Dutch Corpus. Overview and first Evaluation. ", In Proc. LREC, Genoa, Italy (2000).

H. Van hamme "Integration of Asynchronous Knowledge Sources in a Novel Speech Recognition Framework" ISCA ITRW, Speech Analysis and Processing for Knowledge Discovery (2008).

L. ten Bosch et al. "A Computational Model of Language Acquisition: the Emergence of Words" Fundamenta Informaticae, vol. 90, No. 3, pp. 229-249, 2009.

H. Van hamme "Phonetic Analysis of a Computational Model for Vocabulary Acquisition from Auditory Inputs" 2011 IEEE International Conference on Development and Learning (ICDL), Frankfurt am Main, 2011, pp. 1-6.

V. Stouten et al. "Discovering Phone Patterns in Spoken Utterances by Non-Negative Matrix Factorization" IEEE Signal Processing Letters, vol. 15, pp. 131-134, 2008.

European Office Action from European Patent Application 15 794 862.1 dated Jul. 31, 2019, pp. 1-8.

* cited by examiner

SPEECH RECOGNITION SYSTEM AND METHOD USING AN ADAPTIVE INCREMENTAL LEARNING APPROACH

This application claims priority to U.S. Provisional Patent Application No. 62/166,585 filed on May 26, 2015, the contents of which are incorporated herein by reference.

FIELD OF INVENTION

The present disclosure relates to speech recognition systems and methods using an adaptive incremental learning approach. More specifically, the present disclosure relates to adaptive incremental learning in a self-taught vocal user interface.

BACKGROUND

Automatic Speech Recognition (ASR) systems are typically set up with Hidden Markov Models (HMM), developed with continuous Gaussian mixture (GMM) emission densities and context-dependent phones. Currently, Deep Neural Networks (DNN) that have many hidden layers outperform GMMs on a variety of speech recognition benchmarks [1]. These state of the art ASR systems are trained on large amounts of recorded speech data and benefit from the availability of annotated speech material. The amounts that are required to build a competitive ASR system are usually available for widely spoken languages and for large-scale applications with great economical potential such as speech-to-speech and speech-to-text translation. However, the majority of languages are low-resource languages with a lot of peculiarities in phonotactics, word segmentation or morphology, or dialects lacking strict language convention. Moreover, a considerable share of currently developed ASR applications are tailored solutions with limited economical potential developed for one customer only or for a small user group.

SUMMARY

The present disclosure relates to speech recognition systems and methods using an adaptive incremental learning approach. More specifically, the present disclosure relates to adaptive incremental learning in a self-taught vocal user interface.

Automatic Speech Recognition (ASR) systems are typically set up with Hidden Markov Models (HMM). The state of the art ASR models are trained on large amounts of recorded speech data and benefit from the availability of annotated speech material. Occasionally, adaptation procedures are integrated to provide a speaker-dependent ASR. However, this approach can fall short when used for non-standard speech such as dysarthric speech, or when used for applications for which the interaction protocols are difficult to define beforehand. Speech technology would benefit from training during usage, adapting to the specific vocalizations and emerging expressions of the end user. Embodiments described herein provide a vocal user interface (VUI) model that is able to learn speech recognition and understanding from demonstrations during usage. The VUI as herein described learns the acoustic representation of semantic concepts incrementally and adapts online to changes in pronunciations or word usage. The representations are preferably learned by using, for example, non-negative matrix factorization (NMF) and the acoustic features may be based on a Gaussian mixture model (GMM) that unfolds during usage. These online learning procedures may be based on Maximum A Posteriori (MAP) estimation. However other suitable methods known to those skilled in the art may also be used. In a series of examples, the applicant has compared the latter with their batch learning variants and demonstrate competitive learning rates and a superior adaptive capacity by incorporating a forgetting factor as used in the presently described embodiments.

A vocal user interface (VUI) for speech in low resource settings has been developed, that is, with a few utterances of training data per command (for an overview of the ALADIN VUI, see [2]). The system does not require word segmentation and benefits from rather abstract supervision such as utterance-based semantic content. This kind of supervision unfolds naturally by mining the VUI usage and by automating VUI interactions in which the user is asked to give demonstrations of his/her spoken commands, choosing his/her own words. In contrast, in embodiments described herein a method and system has been developed that advantageously learns speech recognition from scratch at deployment, and improves incrementally using acoustic and semantic demonstrations and feedback from the user, thus offering viable, always learning and highly personalizable, speech recognition solutions for applications such as voice-enabled home automation, voice-enabled cars, wearable computing devices such as smart watches and smart bands, and voice-driven assistive aids. The user's speech and the action states in the target application are two sources of information that are preferably combined using a machine learning algorithm, for example, in embodiments described herein by using Non-negative Matrix Factorization (NMF, see [3]). This machine learning procedure allows the VUI to learn recurrent co-occurring patterns in the semantic and acoustic input. These patterns pertain to the user-specific vocabulary. In [4], it was demonstrated that this procedure learns from a few demonstrations if model-based statistical features are used such as co-occurrence statistics of GMM posteriors or HMM phone posteriors. Moreover, in a comparative study [5] with conventional ASR methods adapted to dysarthric speech (see the STARDUST [6] and VIVOCA [7] projects), it was shown that the NMF-based system provides competitive results in word and sentence-based recognition accuracy, but offers a substantial reduction in the training material needed to approach asymptotic accuracy.

Another fast learning algorithm, known in the art, operating on limited storage space and small vocabulary is Dynamic Time Warping (DTW) [8], [9]. DTW is a template-based technology using a dynamic programming alignment process to find the similarity between two speech signals. In embodiments described herein, the applicant has advantageously aimed to unify model-based advances such as model adaptation with template-based advantages such as fast speaker-dependent learning and the use of limited storage resources. Whereas the NMF-based approach has been compared with conventional HMM and GMM methods [10], [5], [11], embodiments described herein incorporate a DTW baseline in this study. Although DTW is an early developed ASR technique, DTW has been popular in lots of applications despite its limitations with respect to adaptation and robustness. For example, in [8] a HMM-like DTW procedure was proposed in which HMM-like acoustic models were trained for each of DTW referenced templates. Their procedure enables model adaptation and merges different word examples in one template. Inspired by [12], embodiments described herein introduce an adaptive DTW procedure by updating the DTW referenced templates by the last online presented examples.

Competing voice-enabled personalizable technologies have been investigated in projects such as DIRHA [13], SWEET-HOME [14] and HomeService [15], and others like [16] and [17]. Speaker-independent ASR systems are used together with speaker adaptation procedures. Contrary to the adaptation approach, the targeted VUI training procedure according to embodiments described herein is aimed at building semantic-acoustic representations from online learning using speech and demonstrations of the user. A typical aspect of the training material consisting of interactive experiences is the incremental data exposure of user commands and demonstrations. A significant contribution of embodiments described herein is the fitting of Maximum A Posteriori (MAP) algorithms into incremental learning procedures operating on weak supervision and incrementally exposed speech data. To this end, embodiments described herein provide adopting probabilistic incremental models conforming the batch learning procedures pursued in the preceding studies [4], [5] and pursued adaptivity by incorporating a forgetting factor in the incremental models. Similar to the DTW approach that does not require model training, embodiments of a VUI model according to that described in greater detail below, is to provide a first model-based approach that builds its ASR models from scratch, that is from for example preprocessed features such as MFCC features and utterance-based semantic content.

In a state of the art method, the VUI model provided uses batch learning procedures that required data storage and computational resources that correlated with the amounts of stored training data. Conversely, embodiments of the introduced VUI model advantageously do not necessarily store data and/or use limited computational resources as processing only involves the commands of the current actions. The latter is also evidenced by the empirical comparison between incremental and batch learning procedures considering real learning environments targeting Command and Control (C&C) home automation for dysarthric speech. These experiments focus on fast learning and life-span adaptation to user's vocal characteristics.

It is an advantage of embodiments described herein that existing MAP algorithms are adapted to a demonstration-driven incremental learning context which are very effective. Based on these algorithms, one advantageously may compose several realistic procedures (that are validated further on in a series of examples, whereby these examples aim at fast learning and adaptation.

Embodiments described herein preferably include training during usage, more specifically adapting to the specific vocalizations and emerging expression of the end user. It is an advantage of embodiments described herein that a vocal user interface (VUI) according to embodiments of the invention enable learning speech recognition and understanding from demonstrations during usage.

In further preferred embodiments, the presence or absence of a spoken referent for these predefined semantics is introduced by for example mining a demonstrated action on targeted devices. In embodiments described herein, it is assumed that a vector representing the relevant semantics (e.g. by using a utterance based vector which is augmented with a binary vector) is given for each spoken utterance.

Accordingly, in one aspect there is provided a method of processing and/or recognizing acoustic signals, the method comprising: incrementally learning at least one model associating input acoustic signals with input semantic frames to enable adaptive changes in the acoustic signals; generating a semantic frame from an input acoustic signal according to the at least one model; and mapping the semantic frame to a predetermined action.

In another aspect, there is provided a computer readable medium comprising computer executable instructions for performing the above-noted method.

In yet another aspect, there is provided a system for processing acoustic signals, the system comprising a processor and memory, the memory comprising computer executable instructions for performing the above-noted method.

In yet another aspect, the above-noted system comprises a cloud-based device for performing cloud-based processing.

In yet another aspect, there is provided an electronic device comprising an acoustic sensor for receiving acoustic signals, the above-noted system, and an interface with the system to perform the action when the mapping is successful.

In yet another aspect, there is provided a computer program having instructions which when executed by a computing device cause the computing device to perform the above-noted method.

In yet another aspect, there is provided a data stream which is representative of the above-noted computer program.

The computing device may comprise a processor and memory for storage of the instructions.

BRIEF DESCRIPTION OF DRAWINGS

FIG. 6a illustrates data from memoryless procedures, whereas FIG. 6b illustrates DTW and procedures storing data.

FIG. 7a illustrates data from memoryless procedures, whereas FIG. 7b illustrates DTW and procedures storing data.

DETAILED DESCRIPTION

Figure 1:
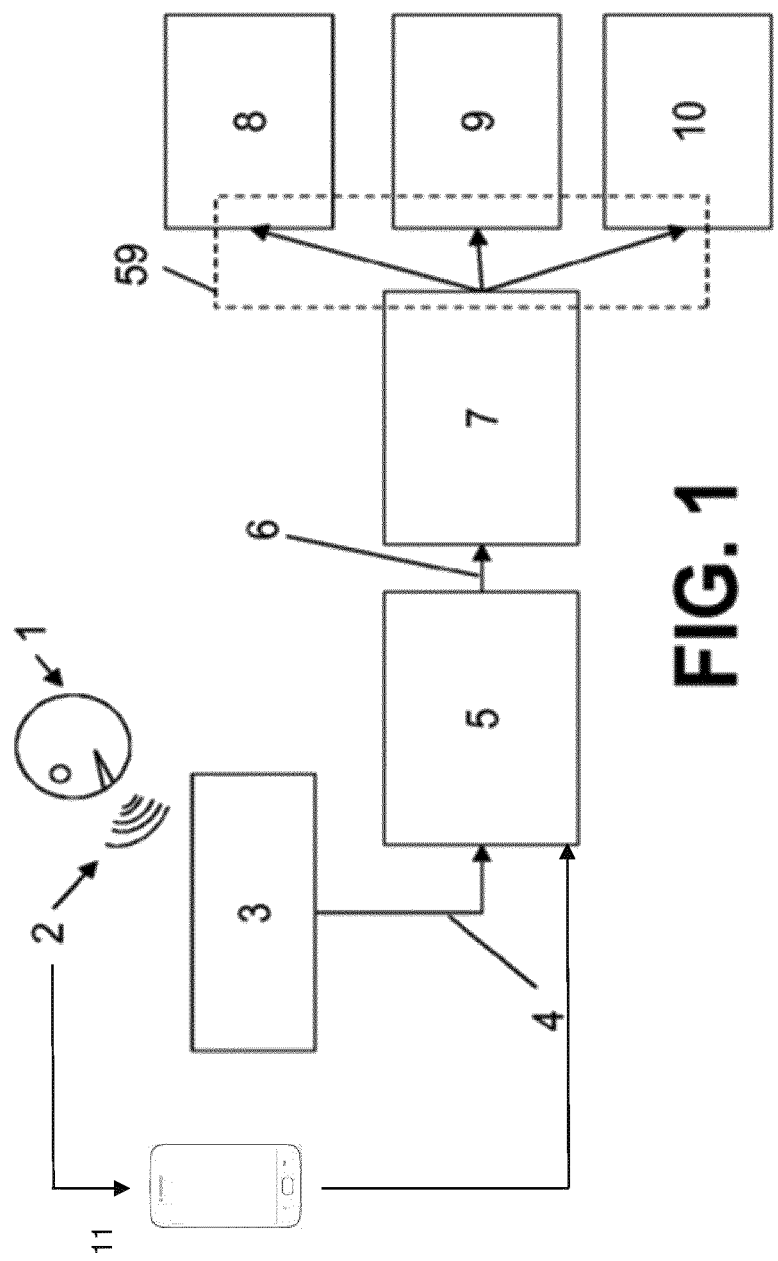
FIG. 1 is a schematic diagram of an example of a system for a user interface configured to control at least one apparatus using a speech input.

The following will be described with respect to particular embodiments and with reference to certain drawings but the principles described herein should not be limited thereto.

The drawings described are only schematic and are non-limiting. In the drawings, the size of some of the elements may be exaggerated and not drawn on scale for illustrative purposes. The dimensions and the relative dimensions do not correspond to actual reductions required to practice the embodiments described herein.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the principles described herein, the only relevant components of the device are A and B.

Reference throughout this specification to "one embodiment" or "an embodiment" means that a particular feature, structure or characteristic described in connection with the embodiment is included in at least one described embodiment. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed embodiment requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment. Furthermore, while some embodiments described herein include some but not other features included in other embodiments, combinations of features of different embodiments are meant to be within the scope of the principles described herein, and form different embodiments, as would be understood by those in the art. For example, in the following claims, any of the claimed embodiments can be used in any combination.

In the description provided herein, numerous specific details are set forth. However, it is understood that embodiments may be practiced without these specific details. In other instances, well-known methods, structures and techniques have not been shown in detail in order not to obscure an understanding of this description.

Wherein in embodiments described herein, reference is made to "acoustic signal", reference may be made to any acoustical signal comprising a representation of at least an utterance or distinguishing sound which may be generated by the vocal chords of a human or animal. Moreover, the use of musical or unmeaningful sounds (like for example whistling or singing) or other sounds generated by a machine can be considered as acoustical input.

Wherein in embodiments described herein, reference is made to "clustering layer" reference may be made to a layer enabling clustering, which may comprise grouping a set of objects in such a way that objects in the same group (called a cluster) are more similar (in some sense or another) to each other than to those in other groups (clusters). Examples of clustering layer may be a Gaussian mixture model (GMM), k-means clustering, self-organizing maps, spectral clustering, vector quantization methods, neural networks, etc.

Wherein in the embodiments described herein, reference is made to "latent variable layer" reference may be made to the modeling of observable variables by hidden variables. Examples of the latent variable layer may be non-negative matrix factorization (NMF), Bayesian networks, neural networks, etc.

Wherein in embodiments described herein, reference is made to "self-taught" reference may be made to learning by demonstration.

Wherein in embodiments described herein, reference is made to "action state" reference may be made to a semantic representation of an action It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of any component of or related to the systems and modules described herein, etc., or accessible or connectable thereto. Any application or module herein described may be implemented using computer readable/executable instructions that may be stored or otherwise held by such computer readable media. Furthermore, an application and module may be developed using a server client model in cloud infrastructure.

The steps or operations in the flow charts and diagrams described herein are just for example. There may be many variations to these steps or operations without departing from the principles discussed above. For instance, the steps may be performed in a differing order, or steps may be added, deleted, or modified.

It has been recognized that, with respect to VUI versus human language acquisition models, prior disclosures of a VUI used batch learning, i.e. where models are learned from all demonstrations (and implicit confirmations) shown to the device. The device thus requires an ever larger memory to store all examples (henceforth "unbounded memory"). Examples of disclosures are [29],[30]. The first disclosure is in [37].

The advantage of the system described herein is that the memory requirements to store the demonstration data (speech+semantics) as well as the compute time and memory required to compute the model (compute the GMM and the NMF) do not increase at every new demonstration. The process of learning from demonstration can be performed perpetually with a processor equipped with a finite memory.

Originally, the NMF learning model was developed for modeling language acquisition by infants. The applicant then realized the method could be used for a VUI where you have to perform ASR (automatic speech recognition: speech to text) and then NLU (natural language understanding: text to meaning). In the framework of human language acquisition models, learning of keywords and mapping to semantic concepts has been described in [33],[34]. The system described herein is partially based on this theory, as apparent form the references.

Some publications only refer to the ASR task, without human language acquisition or VUI, e.g. [32]. Here only batch learning (unbounded memory requirements) was described.

Now, with respect to adaption and incremental learning, the system described herein uses three mechanisms to adapt to changes in acoustic realization of words (say changes in the voice, language or behavior of the user) and semantic changes: (1) adaptation of the acoustic features by adapting the GMM (the theory is based on [20]), (2) adaptation of the NMF model (the theory is based on [31]); and (3) a prediction of how the NMF model needs to change if the GMM model is adapted.

It should be noted that it is not required that the acoustic features are generated based on a GMM. Phonetic features may be used like evidenced in [32], [38] and [35]. These may be in addition adapted through other methods. In that case, the mechanisms adapting the acoustic features or the NMF model (as described in points (2) and (3) above) are still applicable.

Turning now to the figures, FIG. 1 shows an exemplary system for a user interface configured to control at least one apparatus (or system). The exemplary system seen in FIG. 1 comprises an acoustic sensor 3, audio processor 5, controller 7 and output 8, for example a light output. The system additionally comprises a demonstrator 11, which can be a touch screen, a button on a computing device, a menu scanning device, or a physical device such as an electric switch, etc. In this example, after providing vocal input 2, the user optionally confirms on the demonstrator 11 if the action performed after obtaining the vocal input 2, is correct or incorrect. In case the output would be incorrect, the user in addition may indicate the correct action. As a result the system learns the vocabulary that the user 1 uses. Or in other words the user teaches the system the vocabulary to control the system. The system advantageously learns parameters associated with the voice of the user in pronouncing certain words or phrases (e.g., learning whether the user is a man or a woman, speaking a particular language with a certain type of accent, etc.). Moreover, the system is adapted to learn the voice characteristics of its users. The systems can in addition be used by multiple users having a difference and advantageously the user does not need to confirm his/her language as this is taught to systems by the user.

Sound output 9 and other outputs 10, for example displaying the action on a screen or demonstrator 11, are optionally included in the system. The system enables user 1 to use his/her voice as vocal input 2 to control a device, for example a light output 8. For brevity, the disclosure discusses in detail the example of using the user interface to control a lighting apparatus, but one skilled in the art would appreciate that other types of apparatuses may be controlled in a similar fashion. At acoustic sensor 3, vocal input 2 (or acoustic input generated by a user) is received. Vocal input 2 may be in the form of sound waves traveling through the air to acoustic sensor 3. Exemplary vocal input includes "aaa", "ooo", "eee" sounds that are generated by the vocal chords of a human user or by the mouth, or whole sentences such as "turn on the lights in the living room". Vocal input 2 preferably involves linguistic input such as words, phrases or other sorts of vocabulary. While this disclosure focuses on "vocal input", other types of acoustic input producible by the user are also envisioned, such as acoustic input producible via a device or instrument. Preferably, the acoustic input includes acoustic sound in which a user has control in producing the acoustic sound (i.e., user can effectuate a variable characteristic of the acoustic sound). Acoustic sensor 3 is configured to convert the received vocal input 2 into audio signal 4. Audio signal 4 may be an electrical audio signal and may be an analog or digital signal that represents vocal input 2. Acoustic sensor 3 may be a microphone or any suitable sensor for sensing acoustic waves and converting the sensed waves into a signal.

Once a vocal input 2 is converted into an audio signal 4, audio processor 5 processes audio signal 4 to determine at least one characteristic of the audio signal using any suitable audio analysis methods. In general, lighting apparatus 8 or other types of output devices may be configured. Other types of output such as sound apparatus 9 may also be controlled in a similar manner. Further examples of types of apparatuses (shown as other 10) may include temperature/heat apparatus with configurable temperature output, a rotating fan with configurable speed output, appliances with a configurable output over a large, possibly substantially continuous range, etc. In general, controller 7 generates an output signal (e.g., output signal 59) that may be adapted to control or adjust at least one setting of lighting apparatus 8 in a particular direction.

There are various applications of the principles and systems described herein. Some example applications, without limitation, are: use in a car; use in a home—both in different appliances and as a central hub to control devices/parts of home (home automation); use in computers and mobile devices—to control interface as well as control various apps (devices may include computers, laptops, smartphones, tablets and wearables, etc.); use in virtual reality based systems; in assistive devices for people with disability or for people in distress (e.g. elderly people falling and not able to stand up); in (educational) toys and games; in robots for home as well as industry; for pilots or train drivers in a cockpit or heavy machine operators; in healthcare: both as an interface for the doctors as well as for navigating health records; in healthcare: speech or communication (i.e. autism) impaired users; in a web-api based interface that can be integrated into apps by different developers; etc.

Although many of the experiments described herein are specifically conducted on dysarthric speech, it will be appreciated that principles and/or embodiments of methods and devices described herein can be applied to general speech recognition applications.

Figure 2:
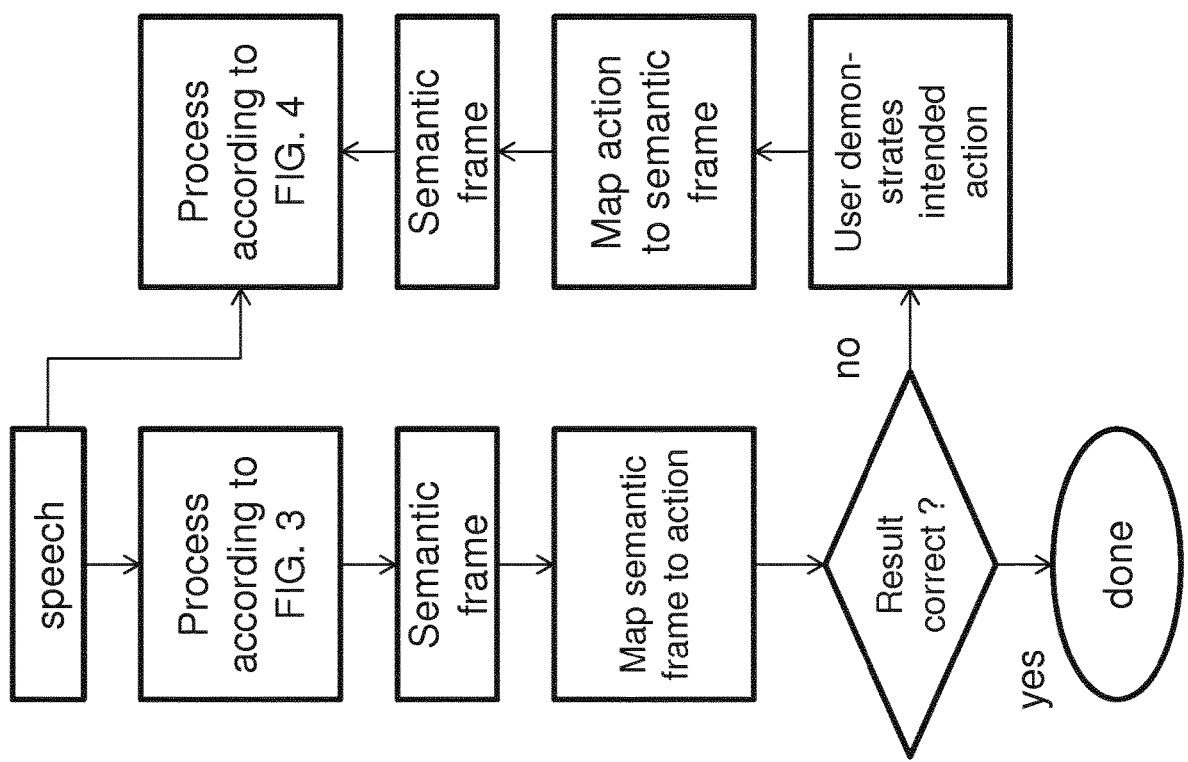
FIG. 2 is a flow chart illustrating exemplary computer executable instructions for processing speech to map semantic frames to actions and performing incremental learning when user feedback is available.

FIG. 2 illustrates a high level summary of a computer executable process that can be performed by a system such as that shown by way of example in FIG. 1. As shown in FIG. 2, input speech is processed according to operations shown in FIG. 3 as well as operations shown in FIG. 4. The operations shown in FIG. 3 (described below), generate a semantic frame. The semantic frame is then mapped to an action and it is determined whether or not the result is correct. If so, the process with respect to that input speech is done. If not, the user can optionally demonstrate the intended action and the system maps the action back to the semantic frame. The semantic frame mapped from the user-demonstrated action is then processed as shown in FIG. 4 to achieve incremental learning Turning to FIG. 3, the input speech is first subjected to feature extraction according to data in a stored GMM database. It is to be noted as indicated earlier, that using a GMM database is provided for the particular, but other clustering methods may be used as well. The output features of this specific embodiment are posteriorgrams. The feature extraction extracts acoustic features from the input speech, which are then subjected to histogram of acoustic co-occurrence (HAC) processing. This generates a HAC vector v. Using the vector v, an activation vector is computed according to the formula: $v=W_a h$, using an NMF. $W_a$ is obtained from a collection of stored word models W. The activation vector h is then used to compute $\alpha=W_s h$, in order to obtain the semantic vector $\alpha$. A decision process is then performed using a semantic frame structure to generate the output semantic frame.

Figure 3:
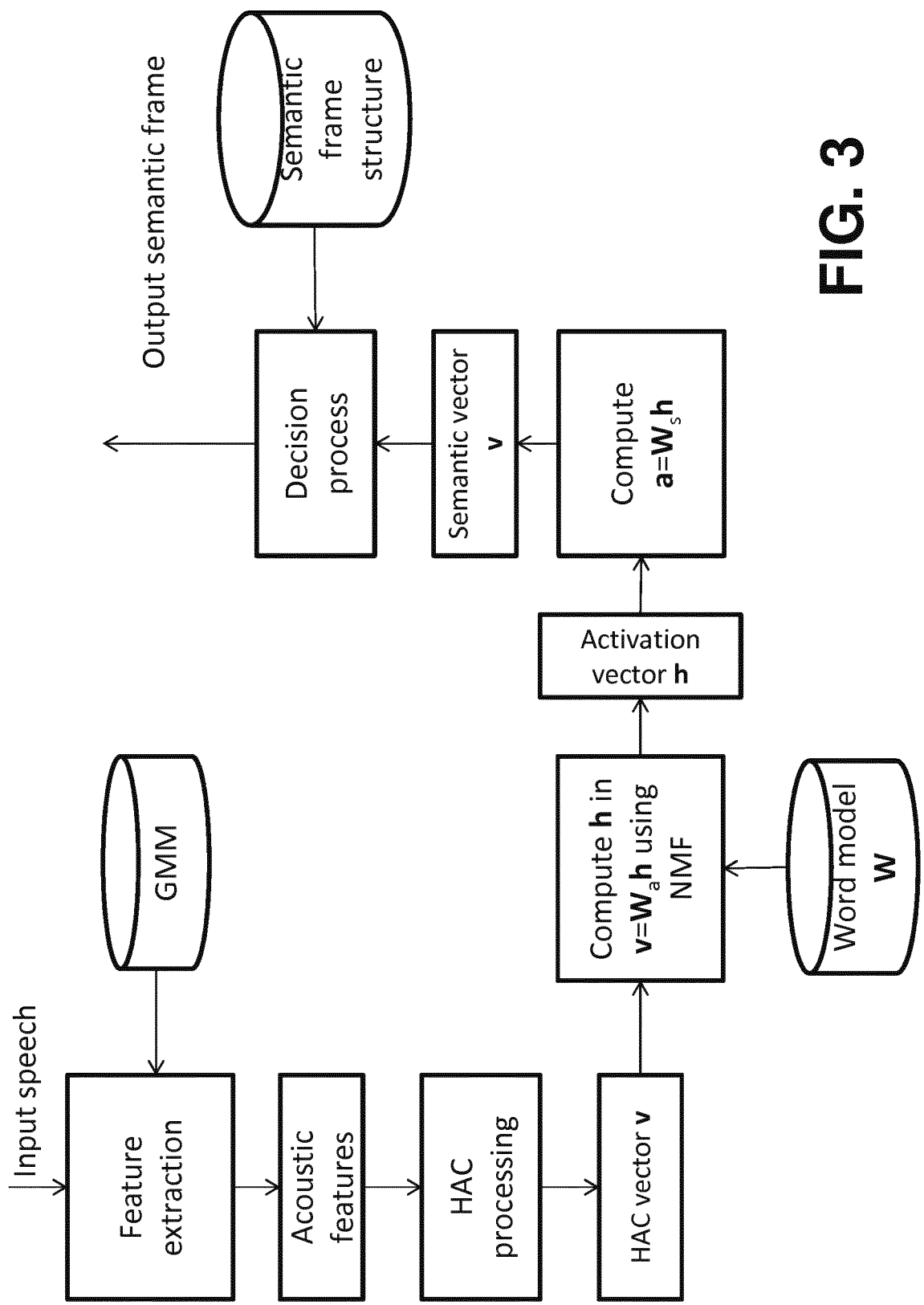
FIG. 3 is a flow chart illustrating exemplary computer executable instructions for generating a semantic frame from speech input.
Figure 4:
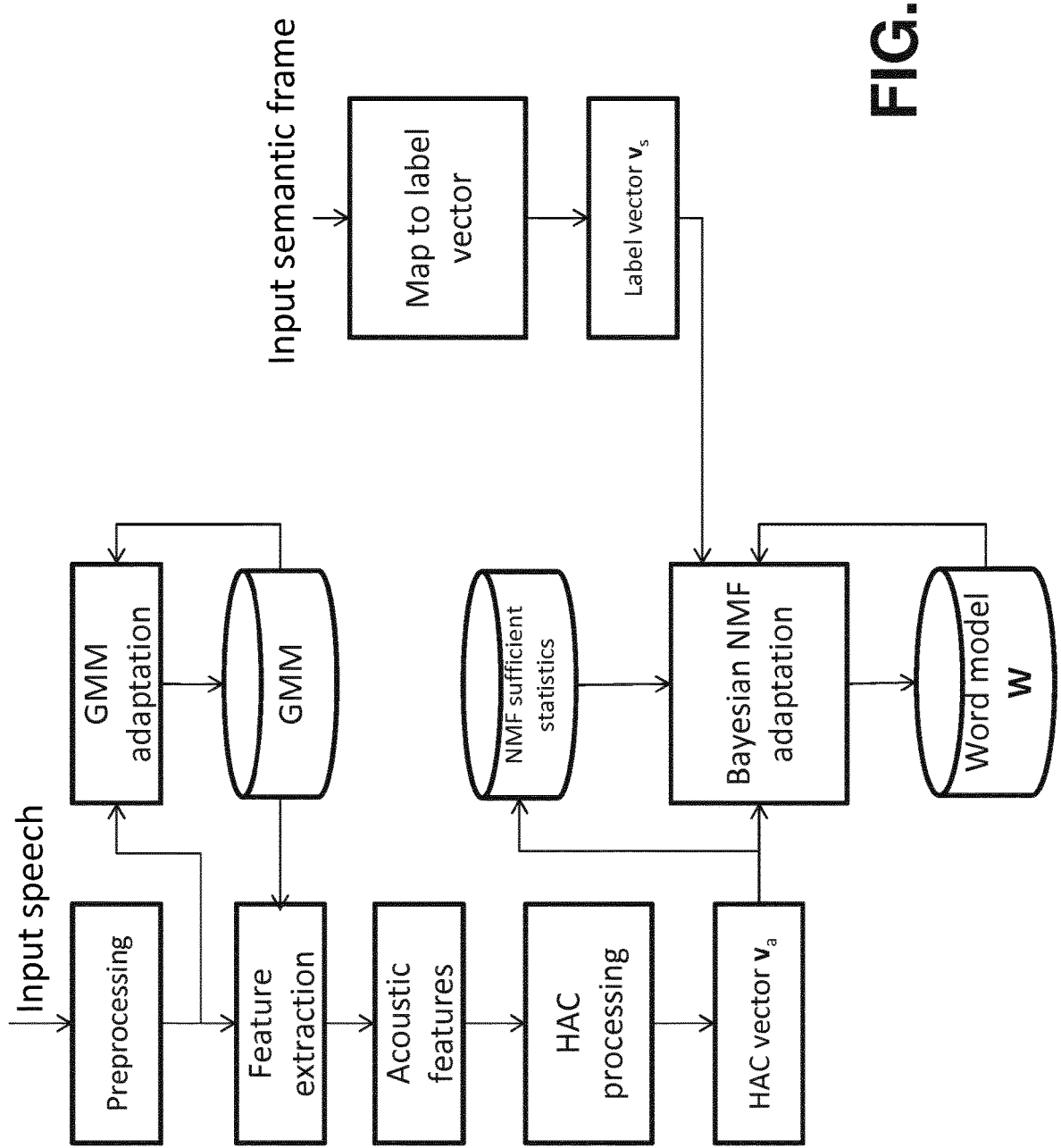
FIG. 4 is a flow chart illustrating exemplary computer executable instructions for performing incremental learning (e.g. NMF adaption and/or GMM) using input speech and an input semantic frame.
Figure 5:
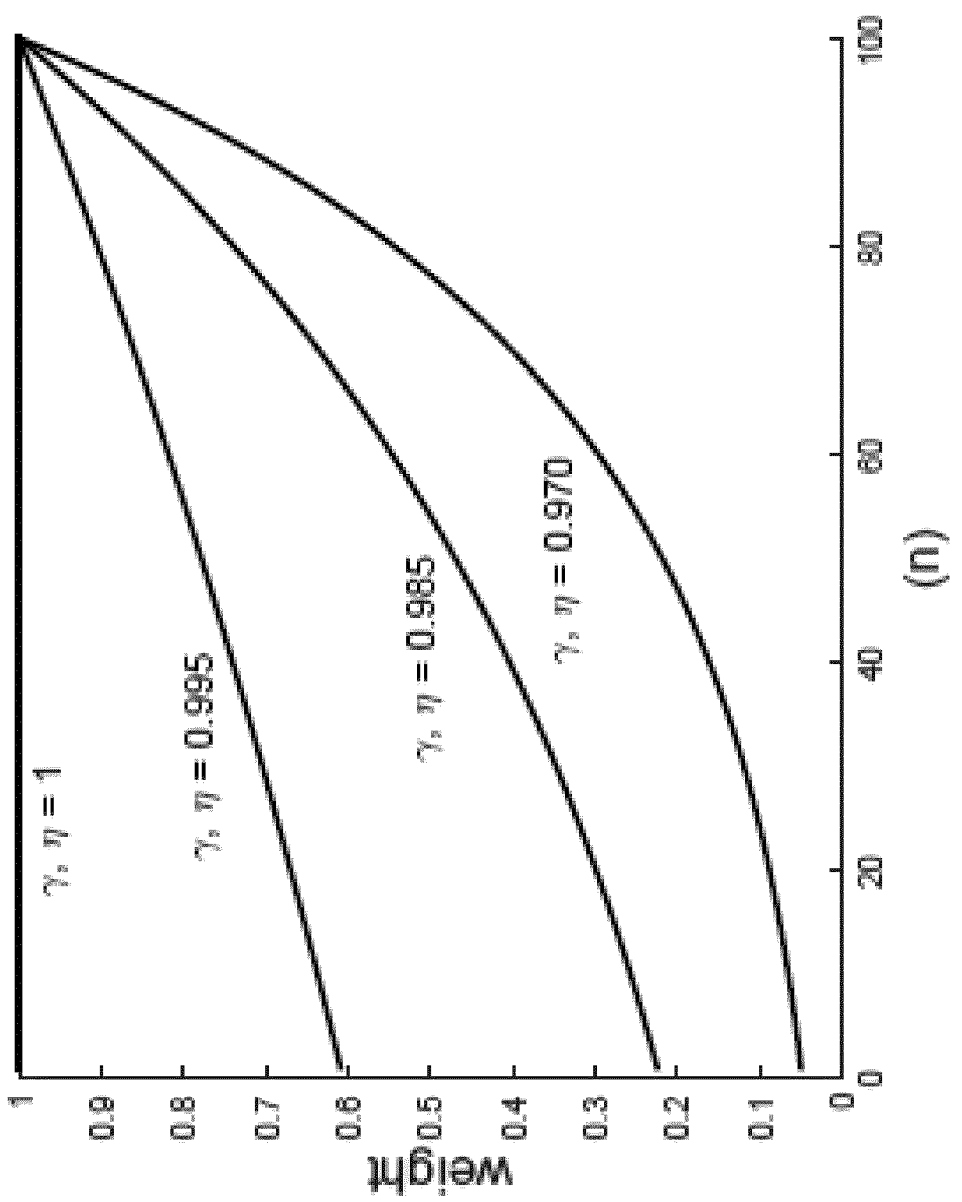
FIG. 5 illustrates the influence of $\gamma$, $\eta$ on the relative weight of statistics collected in preceding epochs according to embodiments described herein.
Figure 6:
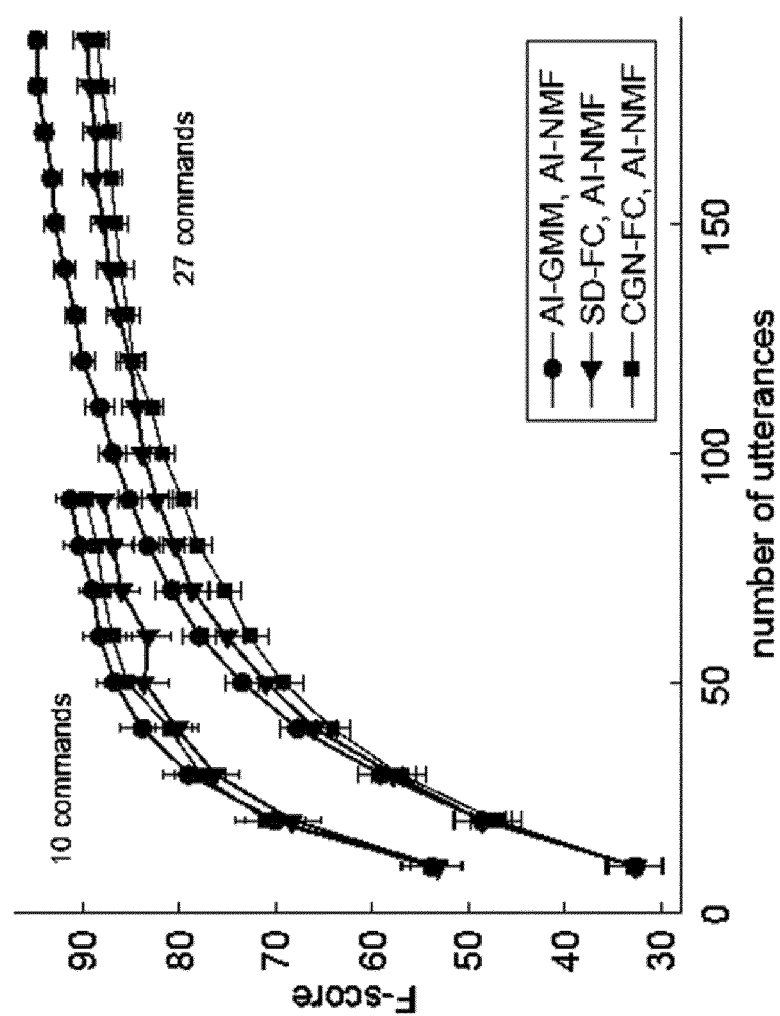
FIGS. 6(a) and 6(b) illustrate VUI learning curves for the first 190 utterances averaged over speakers. The error bars are the average standard errors of the speakers. Individual end scores are presented in Table IV.
Figure 6:
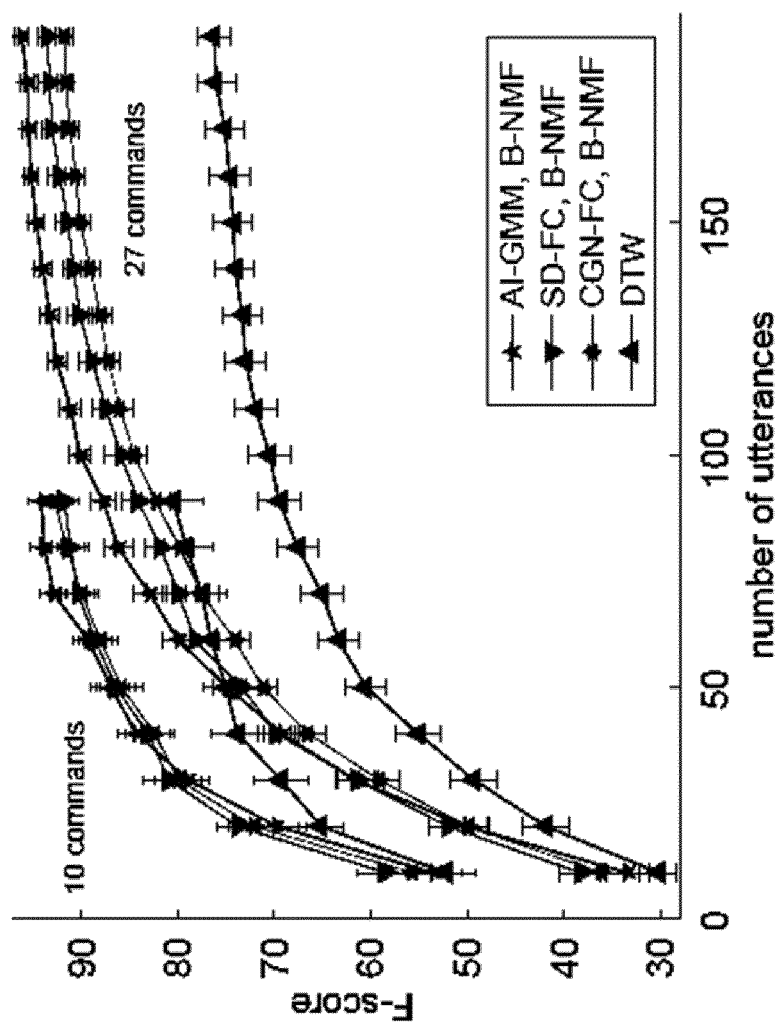
Figure 7:
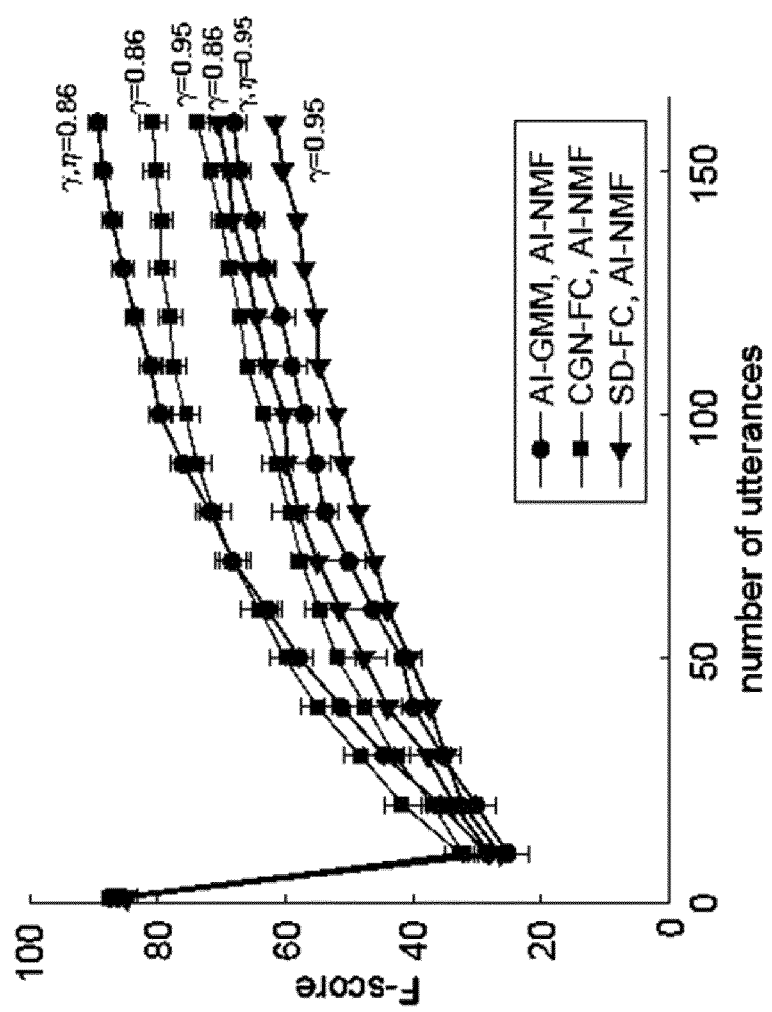
FIGS. 7(a) and 7(b) illustrate an adaptation demonstrated by the different VUI learning curves averaged over speakers for the first 160 utterances following the user change. The error bars are the standard errors. Individual end scores are presented in Table V.
Figure 7:
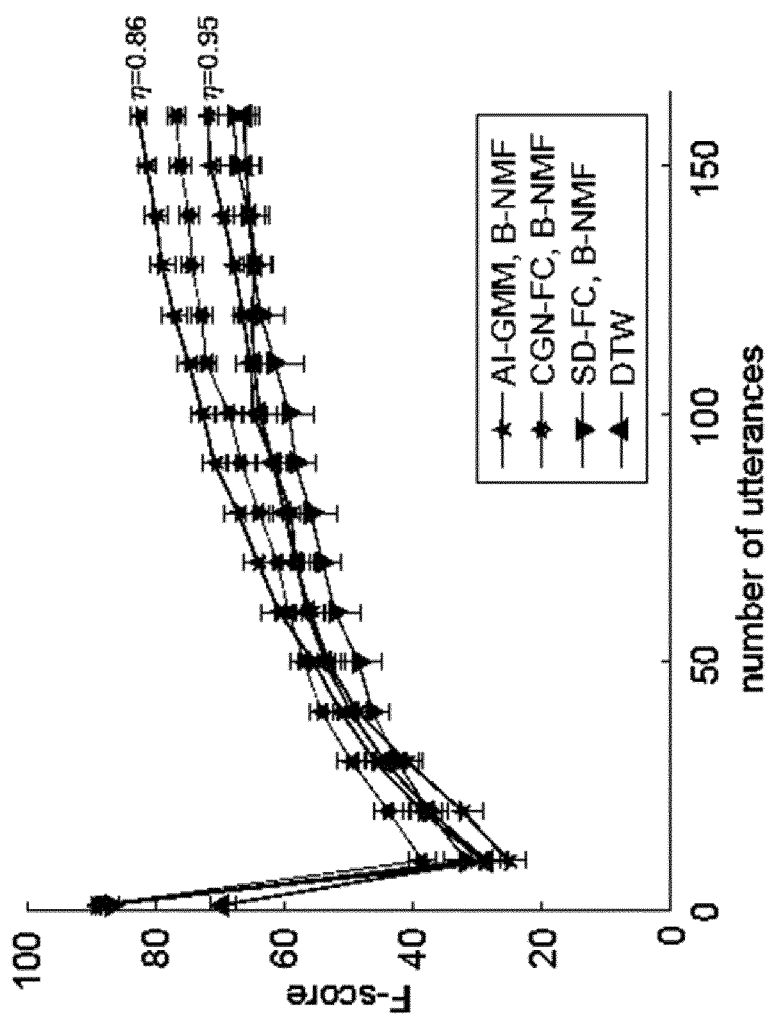

As illustrated in FIG. 4, if the user choses to demonstrate the intended action or confirms the correctness of the action resulting from processing according to FIG. 3, the input speech is also subjected to preprocessing and GMM adaptation to generate a stored GMM for performing feature extraction to determine acoustic features that are subjected to HAC processing. This generates an HAC vector $v_a$, which is used to determine NMF sufficient statistics and Bayesian adaptation in order to adapt the word model W. The input semantic frame is used to map to label vector, $v_s$, which is also used in the Bayesian NMF adaptation.

Further details regarding the operations shown in FIGS. 2-4 will now be described.

In the present text $U_n$ refers to the n-th utterance. Each spoken utterance is composed of a sequence of frame vectors: $U_n=[x^{(1)}, x^{(2)}, \ldots, x^{(t)}, \ldots, x^{(Tn)}]$, where $x^{(t)}$, consists of a column-wise feature vector such as for example Mel-frequency cepstral coefficients (MFCC's), commonly used as features in speech recognition systems. The incremental index t follows the sequential order of the frames. The acoustic feature vectors in the VUI, proposed in [4] and [1], are built in two layers: a clustering and a latent variable layer. In embodiments described herein a first layer is provided which is preferably a GMM with K components and which is used to transform the feature vectors in $U_n$ into a posteriorgram. Persons skilled in the art of machine learning will know that other methods can be used for generating a posteriorgram such as k-means clustering, spectral clustering, self-organizing maps or neural networks. In embodiments, a posteriorgram may refer to a matrix expressing the posterior probability that a frame at time t is generated by the $k^{th}$ Gaussian, denoted by $f_k$. If $k=1, \ldots K$ and $t=1, \ldots, T_n$, then the utterance-based posteriorgram is of size $k \times T_n$. In embodiments described herein a second layer is provided, whereby the second layer preferably factorizes the data using NMF and for this, fixed-length vectors are preferably provided. Persons skilled in the art of machine learning will know that NMF can be replaced by other machine learning techniques such as multi-layer perceptrons, deep neural networks, auto-encoders, restricted Boltzmann machines, or (probabilistic) latent semantic analysis. Therefore, posterior likelihoods are converted into Histogram of Acoustic Co-occurrence (HAC) features (see [16]) by accumulating the probability of observing a frame at time t and another frame at time$t+\tau$ generated by the Gaussian components $f_k$ and $f_l$, respectively, with $1 \leq k$, $l \leq K$ and t proceeding from 1 to $T_n-\tau$. The accumulated scores for all $K \times K$ co-occurring Gaussian pairs in utterance n are stacked in a column-wise vector denoted by $v_n$. If the number of Gaussian mixture components is held constant, then all preceding utterance-based feature vectors $v_1$, $v_2, \ldots, v_{n-1}$ have the same length. The matrix composed of all utterance-based HAC features including utterance n and its preceding utterances is denoted by $V=[v_1, v_2, \ldots, v_n]$.

In preferred embodiments the utterance-based vector $v_n$ is preferably augmented with a binary vector $a_n$, representing the relevant semantics that users refer to when they control a device by voice. Therefore, in embodiments all semantics that describe C&C actions in the VUI-user context are preferably predefined and a fixed-length vector is composed in which entries represent the presence or absence of a vocal expression referring to one of these predefined semantics. The presence or absence of a spoken referent for these predefined semantics is preferably brought in by mining the demonstrated action on the targeted devices. The collection of this information is application- and device-dependent. For the purpose of giving a general VUI description, it is assumed that this vector is given for each spoken utterance. The collection of all semantics including those guiding utterance n, is denoted by $A=[a_1, a_2, \ldots, a_n]$. In Table I, a data matrix with four columns is depicted and each column represents one utterance. The first utterance is an expression in which the user demonstrated the opening of the blinds. This action is guided with nine acoustic co-occurrence scores in this example. The upper part in Table I exemplifies the A matrix, whereas the lower part exemplifies the V matrix.

TABLE I

Example of a data matrix with four semantic entries and HAC features for three Gaussians

| | | | | |
|---|---|---|---|---|
| referent <Kitchen door> | 0 | 1 | 0 | 0 |
| referent <open> | 1 | 1 | 0 | 1 |
| referent <living room> | 0 | 0 | 0 | 1 |
| referent <blinds> | 1 | 0 | 0 | 1 |
| Gaussians: 1 ≺ 1 | 0.1 | 0 | 0.1 | 0 |
| Gaussians: 1 ≺ 2 | 2.5 | 0 | 0.8 | 0.1 |
| Gaussians: 1 ≺ 3 | 0.5 | 0 | 0 | 4 |
| Gaussians: 2 ≺ 1 | 0 | 0 | 0 | 0.5 |
| Gaussians: 2 ≺ 2 | 0 | 0 | 2 | 0 |
| Gaussians: 2 ≺ 3 | 0 | 0 | 0 | 0 |
| Gaussians: 3 ≺ 1 | 0 | 0.9 | 0 | 0 |
| Gaussians: 3 ≺ 2 | 0 | 1 | 0 | 0 |
| Gaussians: 3 ≺ 3 | 0.2 | 0 | 0 | 0 |

It is an advantage of embodiments described herein that users can choose their own words. Therefore, according to preferred embodiments, a machine learning method is provided that is able to learn from semantic supervision without annotations of specific word usage. Moreover, as can be seen in Table I, supervision does not include word order, segmentation markers or phonetic descriptions. However, it has been shown in [4] and [11] that NMF is able to fulfill these requirements. Semantic and acoustic input data are preferably jointly factorized in order to find the HAC patterns that co-occur with the semantic entities:

$$\begin{bmatrix} A \\ V \end{bmatrix} \approx \begin{bmatrix} W_0 \\ W_1 \end{bmatrix} H. \quad \text{Eq. 1}$$

The co-occurrence of semantic and acoustic features are found in the columns $W_0$ and $W_1$, respectively, whereas the columns in H indicate which co-occurring patterns are active in the respective utterance-based columns in A and V.

The non-negative matrix factorization is regulated by preferably minimizing the Kullback-Leibler divergence between both sides, so that $$(H, W_1, W_0) = \underset{(H^*, W_1^*, W_0^*)}{\mathrm{argmin}} [D_{KL}(V\|W_1^* H^*) + \beta D_{KL}(A\|W_0^* H^*)] \quad \text{Eq. 2}$$

With $\beta$ a weight balancing the relative importance of co-occurring semantic-acoustic patterns against the recurrence of acoustic data patterns. A common practice is to match the L1-norm of A and V, and set $\beta$ equal to one.

Embodiments described herein provide a VUI model that adopts the global structure in [4] and [11]—which preferably comprise a clustering layer and a latent variable layer—but performs incremental learning. In the clustering layer, preferably a GMM is trained incrementally. The GMM preferably transforms feature vectors $x^t$ into a posteriorgram. In the latent variable layer, according to embodiments of the invention, incremental NMF learning [17] associates the HAC features in $v_n$ to the semantics in $a_n$. Incremental NMF is closely related to Probabilistic Latent Semantic Analysis (PLSA), which can advantageously be thought of to consist of the probabilistic version of NMF with the Kullback-Leibler divergence as cost function (see [18] and [19]).

For incremental learning, according to embodiments described herein, a method of maximum a posteriori (MAP) estimation is preferably adopted. In the following, MAP estimation is explained for GMM's [20] and PLSA [21], then, in embodiments the PLSA method is transposed to incremental NMF and preferably a forgetting factor is included in both layers. Since both layers, according to embodiments described herein learn from scratch, the application will further explain how changes in the clustering layer are treated in the latent variable layer.

A. MAP Estimation

In embodiments described herein, it is supposed that input data is available in chunks presented in separate and sequential epochs. The sequential order is denoted by the index i. Each epoch contains a number of utterances denoted by the constant $O_i$. Presume that utterance n is the last utterance in epoch i and that all utterances in i are contained in a matrix denoted by $U^{(i)}$, then $n=\Sigma_{j=1}^{i} O_j$ and $U^{(i)}=[U_{n-O_i+1} \ldots, U_{n-1}, U_n]$. In this text all input data from all preceding epochs is represented by $\mathcal{U}^{(i-1)}=[U^1, \ldots, U^{(i-2)}, U^{(i-1)}]$. Similarly, the utterance-based feature vectors are presented epoch-wise as follows: $V^{(i)}=[v_{n-O_i+1}, \ldots, v_{n-1}, v_n]$ and $A^{(i)}=[a_{n-O_i+1}, \ldots, a_{n-1}, a_n]$. The data set in all preceding epochs is represented by $\mathcal{V}^{(i-1)}=[v^1 \ldots, v^{(i-2)}, v^{(i-1)}]$ and $\mathcal{A}^{(i-1)}=[A^1, \ldots, A^{(i-2)}, A^{(i-1)}]$.

The following equation expresses the relation between the prior and the posterior distribution of the parameter set for the incremental GMM.

$$g(\theta^{\mathcal{U}(i)}) \propto f(U^{(i)}|\theta) g(\theta^{\mathcal{U}(i-1)}) \quad \text{Eq. 3}$$

with $\theta$ denoting the GMM parameter set, g denoting the joint probability of the parameter set given the prior exposed data and f denoting the likelihood of the data in epoch i, given the parameter set. The mode of the posterior distribution is defined as follows $$\theta_{MAP} = \underset{\theta}{\mathrm{argmax}} f(U^{(i)}|\theta) g(\theta|\mathcal{U}^{(i-1)}) \quad \text{Eq. 4}$$

If we consider HAC features and semantics separately, then MAP estimates in both streams are defined as (see [21])

$$\varphi_{MAP} = \underset{\varphi}{\mathrm{argmax}} f(V^{(i)}|\varphi) g(\varphi|\mathcal{V}^{(i-1)}) \quad \text{Eq. 5}$$

$$\vartheta_{MAP} = \underset{\vartheta}{\mathrm{argmax}} f(A^{(i)}|\vartheta) g(\vartheta|\mathcal{A}^{(n-1)}) \quad \text{Eq. 6}$$

With $\varphi$ and $\vartheta$ the parameter set of the PLSA model for the HAC features and the semantics, respectively. In preferred embodiments f is preferably chosen from the exponential family and g from the respective conjugate family, such that the MAP estimation is advantageously less complicated. Moreover, advantageously this combination possesses a sufficient statistic of fixed dimension, meaning that the parameters only depend on the data through the sufficient statistics. Consequently, all relevant information for parameter estimation is passed on to the following epoch by keeping track of a few data-dependent statistics, thus obviating the need for storing data.

B. MAP Updates in the GMM

If the total number of frames in epoch i is $T=\Sigma_{j=n-O_i}^{n} T_j$, then the likelihood function of the GMM with K p-dimensional multivariate normal densities is expressed as follows $$f(U^{(i)}|\theta) = \prod_{t=1}^{T} \sum_{k=1}^{K} \omega_k f_k(x_t|\mu_k, \Sigma_k). \quad \text{Eq. 7}$$

where $\omega_k$ denotes the mixture proportion for the $k^{th}$ mixture component subject to $\Sigma_{k=1}^{K} \omega_k = 1$ and $f_k \sim \mathcal{N}(\mu_k, \Sigma_k)$. Unfortunately, the p.d.f. of a GMM is not a member of the exponential family. Moreover, the mixture component generating the observation is unknown. The expectation-maximization (EM) [22] algorithm is often used in cases when models involve incomplete data. The EM algorithm exploits the fact that the complete-data likelihood is easier to maximize than the likelihood of the incomplete data. The complete data likelihood is the joint likelihood of the observed data and the missing data in which the occupation of observations in mixture components is unknown. The idea in [20] was to consider the generative process of the complete data as being modelled by the joint p.d.f. of two distributions from the exponential family. This implementation still allows for an easy updating scheme. Gauvain and Lee [20] proposed a multinomial distribution for the sample sizes of the component distributions and a multivariate Gaussian density for each component population. They assumed a Dirichlet distribution for the prior density of the multinomial parameters. These parameters correspond with the mixture proportions $\omega_k$ of the GMM, $$g(\omega_1, \omega_2, \ldots, \omega_K \mid \alpha_1, \alpha_2, \ldots, \alpha_K) \propto \prod_{k=1}^{K} \omega_k^{\alpha_k - 1}, \qquad \text{Eq. 8}$$

where $\alpha_k > 0$ are parameters of the Dirichlet distribution. Gauvain and Lee used a normal Wishart density as the conjugate prior for the precision matrix. Equivalently, in embodiments described herein a normal-inverse Wishart is provided as the conjugate prior for the variance-covariance matrix $\Sigma_k$. The normal-inverse Wishart takes the form $$g(\mu_k, \Sigma_k \mid \mu_{0k}, \lambda_k, \Psi_k, v_k) \propto \qquad \text{Eq. 9}$$
$$\frac{1}{|\Sigma_k|^{\frac{v_k + p + 1}{2}}} \exp\left[\left(-\frac{\lambda_k}{2}(\mu_k - \mu_{0k})^T \Sigma_k^{-1}(\mu_k - \mu_{0k})\right] \exp\left(-\frac{1}{2} tr(\Psi_k \Sigma_k^{-1})\right),$$

Where ($\mu_{0k}$, $\lambda_k$, $\psi_k$, $v_k$) are hyper parameters such that $\lambda_k > 0$ and $v_k > p-1$. The total prior density is the product of the prior in Eq. 8 and 9:

$$g(\theta \mid \mathcal{U}^{(i-1)}) = g(\omega_1, \omega_2, \ldots, \omega_K) \prod_{k=1}^{K} g(\mu_k, \Sigma_k). \qquad \text{Eq. 10}$$

MAP estimates in [20] are obtained by using the EM algorithm [22]. The algorithm preferably comprises of iteratively maximizing the auxiliary function $R(\hat{\theta}, \theta)$ which is composed of two terms:

$$R(\hat{\theta}, \theta) = Q(\hat{\theta}, \theta) + \log(g(\theta \mathcal{U}^{(i-1)})). \qquad \text{Eq. 11}$$

$Q(\hat{\theta}, \theta)$ is the auxiliary function used to obtain ML estimates and $\hat{\theta}$ denotes the MAP and the ML estimate of $\theta$ using R and Q, respectively. Organising the exponential of R in the same form as its prior in Eq. 10 yields the following equations [20]:

$$c_{kt}^{(i)} = \frac{\hat{\omega}_k^{(i)} f_k(x_t \mid \hat{\mu}_k^{(i)}, \hat{\Sigma}_k^{(i)})}{\sum_{k=1}^{K} \hat{\omega}_k^{(i)} f_k(x_t \mid \hat{\mu}_k^{(i)}, (\hat{\Sigma})_k^{(i)})}. \qquad \text{Eq. 12}$$

with $c_{kt}^{(i)}$ the posterior likelihood that sample $x_t$ is generated by Gaussian k. The occupation number for component k, denoted by $c_k^{(i)}$, is given by $$c_k^{(i)} = \sum_{t=1}^{T_i} c_{kt}^{(i)}. \qquad \text{Eq. 13}$$

The following statistics are preferably adjusted in each EM step, and updated after convergence for each new epoch i:

$$\alpha_k^{(i)} = \alpha_k^{(i-1)} + c_k^{(i)}, \qquad \text{Eq. 14}$$

$$\mathcal{V}_k^{(i)} = \mathcal{V}_k^{(i-1)} + c_k^{(i)}, \qquad \text{Eq. 15}$$

$$\lambda_k^{(i)} = \lambda_k^{(i-1)} + c_k^{(i)}, \qquad \text{Eq. 16}$$

$$X_k^{(i)} = X_k^{(i-1)} + \sum_{t=1}^{T_i} c_{kt}^{(i)} x_t, \qquad \text{Eq. 17}$$

$$S_k^{(i)} = S_k^{(i-1)} + \sum_{t=1}^{T_i} c_{kt}^{(i)} x_t x_t'. \qquad \text{Eq. 18}$$

These statistics are used to obtain the MAP parameters in each maximization step as follows, $$\hat{\omega}_k^{(i)} = \frac{\alpha_k^{(i)} - 1}{\sum_{j=1}^{K} \alpha_j^{(i)} - K}, \alpha_k > 1, \qquad \text{Eq. 19}$$

$$\hat{\mu}_k^{(i)} = \frac{X_k^{(i)}}{\lambda_k^{(i)}}, \qquad \text{Eq. 20}$$

$$\hat{\Sigma}_k^{(i)} = \frac{S_k^{(i)} - \frac{X_k^{(i)} X_k^{(i)'}}{\lambda_k^{(i)}}}{v_k^{(i)} + p + 1}. \qquad \text{Eq. 21}$$

Note that the notation and equations differs from those in [20] where MAP updates, but no incremental learning was introduced.

C. MAP Updates in PLSA

PLSA [23] is used in search engines where the co-occurrence of words and documents is explained by a latent topic variable. PLSA is a model of the observed joint probability of two discrete variables. The joint probability is modelled as a mixture of conditionally independent multinomial distributions, given a latent variable. We denote the co-occurring variables by $m_f \in M = \{m_1, m_2, \ldots, m_F\}$ representing the occurrence of an acoustic event that increments the $f_{th}$ entry in $v_n$ with one and $d_n \in D = \{d_1, d_2, \ldots, d_N\}$ representing the occurrence of utterance n. We denote the latent variable by $z_j \in Z = \{z_1, z_2, \ldots, Z_J\}$ representing the occurrence of a latent entity underlying the occurrence of $v_{fn}$ in utterance n. The joint probability of the observed pair ($m_f$, $d_n$) depends on Z as follows [23]:

$$P(m_f, d_n) = P(d_n) \sum_{j=1}^{J} P(m_f \mid z_j) P(z_j \mid d_n) \qquad \text{Eq. 22}$$

If HAC feature $v_{fu}$ represents the number of events for the co-occurrence of $m_f$ in utterance $d_u$ with u an utterance indicator for the current epoch i, then the likelihood of the data in epoch i is proportional to, $$f(V^{(i)} \mid \varphi) \propto \prod_{f=1}^{F} \prod_{u=n-O_i}^{n} P(m_f, d_u)^{v_{fu}} \qquad \text{Eq. 23}$$

with $\varphi$ denoting the parameter vector containing $P(m_f \mid z_j)$ and $P(z_j \mid d_u)$. The parameter vector containing $P(d_u)$ is trivially found by marginalizing $P(m_f, d_u)$ over $m_f$. In [18] and [20], the joint prior p.d.f. of the parameter vector was chosen to consist of Dirichlet distributions. The prior density is specified as $$g(\varphi \mid \mathcal{V}^{(i-1)}) = \prod_{j=1}^{J} \left( \prod_{f=1}^{F} P(m_f \mid z_j)^{\xi_{fj}-1} \right), \quad \text{Eq. 24}$$

where $\xi_{fj} > 0$ are Dirichlet parameters. Note that this prior density does not include the p.d.f. on the parameter $P(z_j|d_u)$, which is a simplification justified in [18] by considering the occurrence of an utterance to carry no information. Therefore, this variable does not carry useful information to the next epoch. The same procedure in the semantic stream yields the following proportional relation:

$$f(A^{(i)} \mid \vartheta) \propto \prod_{r=1}^{R} \prod_{u=n-O_i}^{n} P(g_r, d_u)^{a_{ru}}, \quad \text{Eq. 25}$$

with $\vartheta$ the PLSA parameter vector corresponding with the semantic stream, with R the dimension of $a_u$ and with $g_r \in G$ a variable representing the occurrence of a semantic event that increments the entry $a_{ru}$ in $a_u$ with one. The prior density of the semantic variables $\vartheta$ is expressed as follows, $$g(\vartheta \mid \mathcal{A}^{(i-1)}) = \prod_{j=1}^{J} \left( \prod_{r=1}^{R} P(g_r \mid z_j)^{\iota_{rj}-1} \right) \quad \text{Eq. 26}$$

with $L_{rj} > 0$ composing parameters of the Dirichlet density in the semantic stream.

In [18], the auxiliary function $R(\hat{\varphi}, \varphi)$ was extended with a forgetting factor $\gamma$ in order to weigh recently collected data statistics heavier than previously collected statistics, thereby providing adaptation to changes in the vocabulary. Here, we incorporate the same forgetting factor and extend the auxiliary function with the likelihood of the semantic stream:

$$R(\{\hat{\varphi}, \hat{\vartheta}\}, \{\varphi, \vartheta\}) = Q(\hat{\varphi}, \varphi) + \beta Q(\hat{\vartheta}, \vartheta) +$$
$$\gamma(\log(g(\varphi(\mathcal{V}^{i-1})) + \beta \log(g(\vartheta \cdot \mathcal{A}^{i-1})))) \quad \text{Eq. 27}$$

Considering that both streams share the same latent variable $P(z_j|d_u)$, the expectation step leads to the following equations:

$$P(z_j \mid m_f, d_u) = \frac{P(m_f \mid z_j) P(z_j \mid d_u) P(d_u)}{\sum_{p=1}^{J} P(m_f \mid z_p) P(z_p \mid d_u) P(d_u)}, \quad \text{Eq. 28}$$

$$P(z_j \mid g_r, d_u) = \frac{P(g_r \mid z_j) P(z_j \mid d_u) P(d_u)}{\sum_{p=1}^{J} P(g_r \mid z_p) P(z_p \mid d_u) P(d_u)}, \quad \text{Eq. 29}$$

and the following equations compose the maximization step:

$$\xi_{fj}^{(i)} = \gamma(\xi_{fj}^{(i-1)} - 1) + 1 + \sum_{u=n-o}^{n} v_{fu} P(z_j \mid m_f, d_u), \quad \text{Eq. 30}$$

$$\iota_{rj}^{(i)} = \gamma(\iota_{rj}^{(i-1)} - 1) + 1 + \sum_{u=n-o}^{n} a_{ru} P(z_j \mid g_r, d_u), \quad \text{Eq. 31}$$

-continued $$P(m_f \mid z_j) = \frac{\xi_{fj}^{(i)} - 1}{\sum_{f=1}^{F} \xi_{fj}^{(i)} - F}, \quad \xi_{fj} > 1, \quad \text{Eq. 32}$$

$$P(g_r \mid z_j) = \frac{\iota_{rj}^{(i)} - 1}{\sum_{r=1}^{R} \iota_{rj}^{(i)} - R}, \quad \iota_{rj} > 1, \quad \text{Eq. 33}$$

$$P(z_j \mid d_u) = \frac{\sum_{f=1}^{F} v_{fu} P(z_j \mid m_f, d_u)}{\sum_{p=1}^{K} \sum_{f=1}^{F} v_{fu} P(z_p \mid m_f, d_u)} + \quad \text{Eq. 34}$$

$$\beta \frac{\sum_{r=1}^{R} a_{ru} P(z_j \mid g_r, d_u)}{\sum_{p=1}^{K} \sum_{r=1}^{R} a_{ru} P(z_p \mid g_r, d_u)}. \quad \text{Eq. 35}$$

with $\beta$ a weighting factor identical to the one in Eq. 2. Note that the notation differs from [18] where the updates are expressed in function of the parameter $\kappa_{fj} = \xi_{fj} - 1$ and where the semantics and acoustics are treated as one. The above equations can be interpreted as a probabilistic version of an extension of the NMF described further on, via the relations:

$$\alpha_{ru} = c_u P(g_r, d_u), v_{fu} = c_{fu} P(m_f, d_u) \quad \text{Eq. 36}$$

$$\omega_{0,rj} = P(g_r \mid z_j), \omega_{1,fj} = P(m_f \mid z_j) \quad \text{Eq. 37}$$

$$h_{ju} = c_u P(z_j \mid d_u) \quad \text{Eq. 38}$$

with a, v, $w_0$, $w_1$ and h denoting entries of $A^{(u)}$, $V^{(u)}$, $W_0$, $W_1$ and H, respectively (see Eq. 1) and $c_u$ an utterance-based constant.

D. GMM with Forgetting Factor

Gaussian parameters are tuned incrementally to the user's speech by processing an increasing number of utterances. Using MAP updates without forgetting factor will strengthen priors more and more as the number of processed utterances increases, reducing thereby the impact of more recent utterances on parameter estimation. In embodiments where a forgetting factor is used, the forgetting factor advantageously may keep priors weaker thus accelerating adaptation on a continuous basis. Similar to the forgetting factor $\gamma$ in Eq. 30, in embodiments described herein a forgetting factor is introduced, denoted by $\eta$, in the GMM. The auxiliary function in Eq. 11 gets the following form:

$$R(\hat{\theta}, \theta) = Q(\hat{\theta}, \theta) + \eta \log(g(\theta^{(i-1)})), \quad \text{Eq. 39}$$

and leads to the following modifications in the equations 14 to 18, $$\alpha_k^{(i)} = \eta(\alpha_k^{(i-1)} - 1) + 1 + c_k^{(i)}, \quad \text{Eq. 40}$$

$$\mathcal{V}_k^{(i)} = \eta \mathcal{V}_k^{(i-1)} + (\eta - 1)(p + 1) + c_k^{(i)}, \quad \text{Eq. 41}$$

$$\lambda_k^{(i)} = \eta \lambda_k^{(i-1)} + c_k^{(i)}, \quad \text{Eq. 42}$$

$$X_k^{(i)} = \eta X_k^{(i-1)} + \sum_{t=1}^{T_i} c_{kt}^{(i)} x_t, \quad \text{Eq. 43}$$

-continued $$S_k^{(i)} = \eta S_k^{(i-1)} + \sum_{t=1}^{T_i} c_{kt}^{(i)} x_t x_t',$$ Eq. 44 keeping all other formalism the same.

The influence of $\gamma$, $\eta$ on the data statistics is depicted in FIG. 1. Here, the utterance n=100 is considered the most recent utterance receiving a reference weight of 1. The curves display the relative weights of the incremental statistics that are accumulated in preceding utterances n<100 using Eq. 40 to Eq. 44. It can be seen in FIG. 1 that the relative weighting is heavily altered by forgetting factors slightly deviating from one.

E. GMM Modifications

On the one hand, incremental learning of GMM parameters improves the GMM gradually by the increasing availability of the data. This is especially useful for non-standard speech or speech in a low-resource language for which representative data is hard to find beforehand. On the other hand, incremental learning alters Gaussian mixture components continuously, which is inopportune since these Gaussians are used as a codebook for composing HAC features. In order to overcome these alterations, forgetting of NMF representations that are built with respect to less recent Gaussians, is preferred. In addition to forgetting, i.e. weakening priors, embodiments described herein provide a transformation that adjusts NMF parameters directly in accordance with GMM modifications. A Gaussian component that alters its mean would induce different posteriors than the ones induced on older data. However, the NMF representations are based on past data and posteriors. Embodiments described herein provide to adjust Gaussian alterations, by estimating how these changes would affect the posteriorgram of the data and modify the learned representations in the NMF layer accordingly.

If all data is stored, then their posteriors for the GMM estimated at epoch i−1 and the GMM estimated at the current epoch i are easily calculated. A K×K transformation matrix could be obtained that transforms posteriors prior to epoch i to those after epoch i. This transformation would be helpful to transform NMF-based representations to a more viable version with respect to the recent GMM. By design, data is not memorized in MAP-based incremental learning, thus impeding this approach. Therefore, we use the GMM of the data in the preceding epoch to simulate the data. If we denote a Gaussian component estimated at epoch i−1 as Gaussian density function $f_k$ and at the current epoch i as $q_l$, then the expected likelihood that a sample drawn from $f_k$ is originating from a density $q_l$ can be expressed as the exponent of the negative crossentropy. For this, we first express the loglikelihood of the simulated data for density $q_l$ given that the samples were drawn from density $f_k$, $$\mathbb{E}_{f_k(x)}[\log l(x)] = \int_x f_k(x) \log q_l(x) dx$$ Eq. 45

Clearly, this expression can be recognized as the negative cross entropy $-H(f_k, q_l)$ with $H(f_k, q_l)$ defined as $$H(f_k, q_l) = \mathbb{E}_{f_k}[-\log q_l]$$ Eq. 46

$$= H(f_k) + D_{KL}(f_k \| q_l)$$ Eq. 47 where $H(f_k)$ denote the entropy of density $f_k$. The negative cross entropy $-H(f_k, q_l)$ can be interpreted as the expected loglikelihood of a sample x considering a drawn from Gaussian $q_l$, but actually generated with density $f_k$. The closed-form for $H(f_k)$ for two Gaussian densities is $$H(f_k, q_l) = \tfrac{1}{2}[\ln|2\pi\Sigma_l| + tr(\Sigma_l^{-1}\Sigma_k) + (\mu_l-\mu_k)'\Sigma_l^{-1}(\mu_l-\mu_j)]$$ Eq. 48

Since there is no stored data, the average likelihood of the fictively generated samples are used as an alternative $$\bar{q}_l(x|\mu_l,\Sigma_l, x \sim \mathcal{N}(\mu_k,\Sigma_k)) \sim e^{-H_{k,ql}}$$ Eq. 49

The expected likelihood $\bar{q}_l$ at epoch i overlap and the posterior likelihoods describes the expected occupation of a sample from $f_k$ with respect to all Gaussians component densities $l_j$, proceeding the current epoch i as follows $$T(k, l) = \frac{\bar{q}_l(x \mid \mu_l, \Sigma_l, x \sim \mathcal{N}(\mu_k, \Sigma_k))}{\sum_{j=1}^{K} \bar{q}_j(x \mid \mu_{l_j}, \Sigma_{l_j}, x \sim \mathcal{N}(\mu_k, \Sigma_k))}$$ Eq. 50 with T having dimensions K×K. The rows of T can be conceived as the repartition of the data generated by the old Gaussians into the new Gaussians. The column-wise HAC representations in $W_1$ are then reshaped into square K×K matrices with accumulated co-occurring scores for all K×K Gaussian pairs, followed by left and right multiplication of T and its transpose, respectively. T could also be considered a smoother, smoothing the posteriorgram with respect to similarity between Gaussian components. It was shown in [24], that smoothing of posteriors yields better performance of NMF-based learning from scarce data. Nonetheless, this transformation is preferably used for initial guessing of $W_1$ parameters as this procedure takes only marginal changes in Gaussian-based pairwise co-occurrences into account. Therefore, new data is preferred to fine-tune this initial guess to real co-occurrence statistics.

In the above mentioned embodiments described herein, incremental VUI learning is introduced in two layers: the clustering layer and the latent variable layer. In alternative embodiments, with respect to incremental learning in the clustering layer, a fixed codebook may be used. A fixed codebook has the advantage that the codebook is consistent throughout the whole experiment. Procedures based on a fixed codebook were used in [4] and [11]. A speaker-independent codebook may be acquired by applying the k-means procedure using randomly selected frames from for example a Dutch non-dysarhtric speech corpus. In embodiments described herein, it may be referred to it as "CGN Fixed Codebook (CGN-FC)". After applying the k-means algorithm, full covariance Gaussians are estimated on the partition of the samples. As for the Gaussians of the GMM, these Gaussians are used to transform feature vectors into a posteriorgram.

In further alternative embodiments according to the present invention, one may use a speaker-dependent fixed codebook by implementation of the k-means algorithm on prior recordings of the user. Although this assumes a speaker-dependent recording step, speaker-dependent training using limited amounts of available data was favored above speaker-independent codebooks in [4]. In embodiments described herein, this may be referred to as "Speaker-Dependent Fixed Codebook (SD-FC)" and use for example the DOMOTICA-3-precursor, namely DOMOTICA-2 which may comprise recordings of the same speakers, for this purpose. The fixed codebooks may be compared against the adaptive incremental procedure as explained further on. The adaptive learning procedure may be referred to as "adaptive incremental GMM (AI-GMM)" in this text.

In the latent variable layer, in embodiments of the present one preferably compares Batch NMF learning (B-NMF) as explained earlier with the adaptive incremental NMF (AI-NMF) variant. In batch learning, the training sets are encoded and factorized as a whole. A transformation like the one proposed in Eq. 50 is not required since the same codebook is used for all utterances. Nevertheless, when the number of spoken commands increases, batch learning will require more and more data memory. Contrarily to batch learning, incremental learning advantageously is memory-less in the sense that only the last data epoch is processed, and thus, memory requirements for this do not grow.

The VUI procedures according to embodiments described herein, are compared with "Dynamic Time Warping (DTW)", frequently used in speaker-dependent small vocabulary embedded applications. In the DTW procedure, a dynamic programming alignment process operating on local dissimilarity is used to find the global dissimilarity between two sequences of feature vectors. When comparing DTW with NMF procedures, DTW has a disadvantage with regard to the kind of supervision used in the VUI model. There are no word segmentations available and since a DTW-based template matching system does not look for recurrent data pattern, commands are learned in one piece. Contrarily, joint NMF as machine learning procedure is capable of finding the word constituents of the utterances based on the statistical regularities; thus, it does not need word segmentations. For example, if the semantic constituents of the commands such as "Open the blinds" and "close the kitchen door" are learned, then an unseen command such as "close the blinds" is theoretically recognizable in the NMF-based decoder, but not in a DTW-based decoder. Since DTW is known as a computational expensive algorithm, only a few examples of each command are usually kept as templates. In embodiments described herein, templates are updated by more recent examples in order to make the DTW-based recognizer adaptive.

EXAMPLES

Having provided a general disclosure, the following examples help to illustrate the general disclosure. These specific examples are included merely to illustrate certain aspects and embodiments of the disclosure, and they are not intended to be limiting in any respect. Certain general principles described in the examples, however, may be generally applicable to other aspects or embodiments of the disclosure.

Operational VUI procedures according to embodiments described herein have been evaluated pertaining to a home automated setting in which users trained the VUI according to the present invention. The explained procedures according to embodiments described herein are compared in three examples as provide below. In the first, several aspects are verified such as the use of a forgetting factor, the adjustment of GMM parameters by the transformation proposed above and the aid of different initialization procedures. In the second example, the applicant compares the learning curve of incremental VUI learning according to embodiments described herein against batch learning procedures, in addition to mixed procedures and DTW. In the third example, the adaptive capacity of these procedures is tested for sustained changes in user's voice.

Setup of the Examples

Speech corpus: The DOMOTICA-3 database [2] contains Dutch, dysarthric speech commands that are typical to home automation. The dataset consists of recordings of speakers that also participated in the collection of the DOMOTICA-2 dataset used in earlier evaluations (see [25] and [11]). First, naturally evoked commands were collected from different users. Lists were composed of these commands. These lists were read repeatedly by multiple dysarthric speakers and led to the DOMOTICA-2 and DOMOTICA-3 dataset collection. The list number and some speaker characteristics such as gender, the total number of utterances (N), the number of different commands (commands) and the intelligibility scores (Intel. score) [26] are listed in Table II. The lists contained 27 commands, but some speakers received reduced lists of 10 commands. An intelligibility score above 85 is considered as normal whereas a score below 85 is considered as impaired. Intelligibility scores are missing for children with personal identification (Pid) 31 and 37 because the instrument in [26] is not designed for child voices. Dysarthria was related to different pathologies such as spastic quadriparesis and multiple sclerosis.

TABLE II

Participants in DOMOTICA-3

| list | Pid | gender | N | commands | Intel. score | Pid | gender | N | commands | Intel. score |
|---|---|---|---|---|---|---|---|---|---|---|
| 1 | 43 | ♀ | 133 | 10 | 89.4 | 46 | ♀ | 97 | 10 | 74.9 |
| 4 | 32 | ♀ | 49 | 23 | 65.6 | 35 | ♀ | 282 | 27 | 72.3 |
| 5 | 48 | ♂ | 170 | 10 | 85.8 | 30 | ♂ | 222 | 27 | 69 |
| 6 | 17 | ♀ | 349 | 27 | 88.6 | 28 | ♀ | 212 | 27 | 73.1 |
| 8 | 31 | ♂ | 233 | 27 | — | 37 | ♂ | 171 | 10 | — |
| 2 | 34 | ♀ | 335 | 27 | 79.9 | 41 | ♀ | 144 | 27 | 66.7 |
| 1 | 29 | ♂ | 181 | 25 | 73.6 | | | | | |
| 3 | 33 | ♂ | 113 | 10 | 66.1 | | | | | |
| 9 | 44 | ♂ | 164 | 27 | 93.9 | | | | | |

Evaluation procedure: The performance of the different procedures was evaluated on a test set that was set apart. It contained one randomly selected exemplar of each unique command. The remaining utterances served as training set. Ten folds were created and each fold presented sentences in a different permuted sequential order of the training utterances and a different test set. In order to evaluate incremental learning, training sets increased with epochs of 10 utterances ($O_i$=10). Evaluation is based on recognition F-scores of semantic values in the test set.

Parameters and initialization: We used MFCC features and the spectral energy including the first and second derivative leading to p=42 feature dimensions in total. Silence frames were removed by using a voice activity detection and mean and variance normalization was applied. K=50 Gaussians was chosen which yielded the best performance for a vocabulary of R=29 semantic entities in the experimental preparation phase. We stacked four sets of HAC features with delays $\tau=2, 5, 9$ and 20 resulting in $4\times50^2$ entries for each utterance-based acoustic representation. These delays have been used in other studies [11]. Each delay-dependent HAC set was treated as a separate multinomial distribution. The semantic multinomial stream was normalized and scaled to have the same L1-norm as the acoustic multinomial streams. Similarly, the semantic part of W had the same L1-norm as the acoustic part. The columns of W were normalized to 1.

In addition to the R=29 columns in W, a few extra W-columns, D=5, were added in order to model filler words. This proportion was constant for all experiments. Each column in H was initialized as an uniform vector with the L1-norm equal to the L1-norm of the respective columns in the data matrix (see Eq. 36 to 38). The acoustic part of W was initialized with uniformly distributed random entries. The semantic part of W was initialized as follows, $$W_0 = \left[ \frac{1}{2} I^{(R\times R)} + \delta \quad \frac{1}{2R} 1^{(R\times D)} + G^{(R\times D)} \right]$$

with I the identity matrix and 1 a matrix of ones, both multiplied with ½ in order to reserve 50% for the acoustics. A is an arbitrary small constant larger than zero and G is a random matrix of appropriate size—dimension are specified in parentheses aside—drawn from the uniform distribution between 0 and $10^{-4}$.

Hyperparameters $\xi_{ij}$, $L_{fj}$, $\lambda_k$, $v_k$ and $\alpha_k$ are set to 1, 5, 1, 43 and 30000, respectively. Informative priors $L_{fj}=5$ are for example chosen in order to avoid that columns of less frequent semantic entities are cultivated by more frequent ones after a few epochs, whereas the informative priors $\alpha_k$ are chosen to prevent that mixture proportions adapt to utterance-based statistics instead of data-based statistics. GMM parameters are initialized as follows: $\omega_k=1/50$, $\Sigma_k=I$ and all $\mu_k$ are randomly selected points on the unit hypersphere surface or adopted from CGN clusters, depending on the initialization procedure at hand.

In the examples, local dissimilarity is based on the cosine similarity between two feature vectors after mean and variance normalization [27]. If $x_a$ and $x_b$ are two mean and variance normalized vectors, then their local dissimilarity is defined as $$d(x_a, x_b) = 1 - \frac{x_a^T x_b}{\|x_a\|\|x_b\|}.$$

In the DTW-based procedure, the last six spoken commands guided by the same unique semantic input were held as DTW templates. These templates were continuously updated with the new encountered examples. In decoding, the most similar template was chosen and the corresponding semantic vector was selected as prediction. This prediction is compared with the semantic annotation of the decoded utterance in the test set. This comparison may allow one to evaluate DTW on the same terms as all the other procedures. In a prior evaluation where we compared five against six retained example templates, we found small gains going from five to six. Therefore, we did not test more than six example templates per command.

Example 1

Setup

GMM adaptation induces changes in the first layer. Since these Gaussians are used as a codebook, these changes digress the acquired NMF representations that are based on an old GMM. The proposed transformation in Eq. 50 reconstructs the NMF representations with respect to the developing Gaussians. VUI learning with and without the use of the transformation was compared for the full incremental procedure, that is "AI-GMM, AI-NMF". Additionally, incremental procedures with and without forgetting factor were evaluated. For this, a forgetting factor: $\eta$, $\gamma=1$ and $\eta$, $\gamma=0.95$ was chosen. A forgetting factor of 0.95 with epochs of 10 utterances corresponds with a forgetting factor of $$0.995 \approx \sqrt[10]{0.95}$$

for epochs containing a single utterance as depicted in FIG. 1. The last variable of interest is the initialization of the Gaussian means: drawn randomly from the surface of a unit hypersphere, or initialized with the cluster means acquired by applying the k-means algorithm on 500,000 randomly selected frames from Corpus Gesproken Nederlands (CGN) [28]. This corpus contains Dutch spoken interviews and news broadcastings. We evaluated the performance of these three variables with binary conditions in a fully crossed experiment and repeated each combination of these variables 10 times, using each time a different order of the utterances. The results were split into two groups of training sets: one group contained training sets of sizes smaller than 100 utterances which are listed in the middle column of Table III, whereas the second group contained sets larger or equal to 100 utterances and listed in the third column of Table III.

TABLE III

The average effect of the manipulations: without a forgetting factor against a forgetting factor, with against without the use of T, and initialization with CGN versus random.

| | Learning examples | | | |
|---|---|---|---|---|
| | <100 | | ≥100 | |
| | average F-score | | | |
| | 67% | | 85% | |
| contrast | Δ (%) | stdev | Δ (%) | stdev |
| $\eta$, $\gamma$ = 1-$\eta$, $\gamma$ = 0.95 | −0.4 | 0.7 | −0.7 | 0.7 |
| with T-without T | 9.4 | 4.1 | 9.5 | 3.1 |
| CGN_init-rand_init | 2.3 | 2.1 | 0.9 | 2.3 |

Results

In Table III, the contrasts are listed for each group. Only the use of the transformation T seemed to yield a significant difference. The average gain was 3.3% and 6.1% absolute improvement for the group of small training sets and the group of the large training sets, respectively. The performance drop by applying a forgetting factor was not significant and initialization with CGN yielded a non-significant improvement of 2.9% and 1.9% for each respective group of training sets. Based on these results, all incremental GMM procedures in the following experiments were fitted with CGN-based initialization and made use of the transformation expressed by Eq. 50. We used forgetting factors $\eta$, $\gamma=0.95$ in the baselines of the following experiments.

Example 2

Setup

The VUI learning curves of the procedures are evaluated. The learning curve provides a measure of the learning rate by which vocal expressions are acquired. Additionally, in case of large training sets, the learning curve levels off and provides a measure of the asymptotic performance that can be reached.

Results

The learning curves of the memoryless procedures according to embodiments described herein are depicted in FIG. 2a, whereas the learning curves of the procedures requiring increasing data storage are depicted in FIG. 2b. The x-axis represents the incrementally growing number of utterances in the training set. The longer curves include speakers with 27 different commands and more than 190 training utterances in total (see Table II). These speakers have Pid 17, 28, 30, 31, 34 and 35. The intelligibility scores range from 69 to 88.6 and was 76.6 on average. The shorter curves include speakers with Pid 33, 37, 43, 46 and 48 who only spoke 10 different commands. The intelligibility scores in this group range from 66.1 to 89.4 and was 79.0 on average. The graphs are especially useful to compare the different codebook procedures because the NMF layers are all the same in each separate panel. A preferred embodiment of the memoryless procedure according to embodiments described herein is "AI-GMM, AI-NMF" displayed in FIG. 2a with circle-shaped markers. For this procedure, the group with 10 different commands reached an F-score of 91.3% on average for training sets of 90 learning examples, whereas the other group reached an F-score of 94.7% on average for 190 learning examples. In FIG. 2b, a similar pattern of results is displayed with respect to the procedures in the clustering layer. The "AI-GMM, B-NMF" procedure, marked with a five pointed star, reached the highest end scores with 94.1% and 96.1% for the short and longer curve, respectively. The short curves rise steeper than the longer ones possibly because of the more restricted vocabulary. Although the differences between the longer curves are clearly visible, a clear pattern of differences was not visible for the shorter ones. Nevertheless, for the longer curves it can be seen that incrementally learned codebooks outperform codebooks trained on pre-recorded user data or CGN. The differentiation of these curves start at about 50 training examples and becomes significant at about 80 to 90 training examples for the longer ones.

In Table IV the final F-scores for each individual is listed for "AI-GMM, AI-NMF", "AI-GMM, B-NMF" and "SD-FC, B-NMF". When comparing F-scores of the two procedures building further on incremental GMM "AI-GMM", i.e. columns six and seven in Table IV, it can be seen that batch NMF was performing better than incremental NMF with an average difference of 1.9%. Batch NMF learning together with speaker-dependent codebooks "SD-FC, B-NMF" as used in [11] and performs at the same level than incremental procedure "AI-GMM, AI-NMF".

TABLE IV

Individual F-scores for different procedures using all available data.

| Pid | Intel. score | Training set size | Commands | Command examples | AI-GMM AI-NMF | AI-GMM B-NMF | FC-SD B-NMF |
|---|---|---|---|---|---|---|---|
| | | | | | F-score (%), $\eta = Y = 0.95$ | | |
| 17 | 88.6 | 322 | 27 | 11.9 | 99.6 | 100 | 99.4 |
| 28 | 73.1 | 185 | 27 | 6.9 | 95.4 | 96.9 | 94.5 |
| 29 | 73.6 | 154 | 25 | 6.2 | 96.7 | 97.5 | 92.0 |
| 30 | 69.0 | 195 | 27 | 7.2 | 94.8 | 96.2 | 92.9 |
| 31 | — | 206 | 27 | 7.6 | 91.5 | 92.1 | 86.2 |
| 32 | 65.6 | 26 | 23 | 1.1 | 65.7 | 65.1 | 64.4 |
| 33 | 66.1 | 103 | 10 | 10.3 | 68.5 | 85.5 | 79.0 |
| 34 | 79.9 | 335 | 27 | 12.4 | 98.3 | 98.3 | 97.9 |
| 35 | 72.3 | 265 | 27 | 9.8 | 96.2 | 97.2 | 95.3 |
| 37 | — | 161 | 10 | 16.1 | 91.5 | 94.0 | 93.0 |
| 41 | 66.7 | 117 | 27 | 4.3 | 96.0 | 97.6 | 96.2 |
| 43 | 89.4 | 123 | 10 | 12.3 | 100 | 100 | 99.5 |
| 44 | 93.9 | 137 | 27 | 5.1 | 99.4 | 100 | 99.4 |
| 46 | 74.9 | 87 | 10 | 8.7 | 98 | 99.5 | 99.0 |
| 48 | 85.8 | 160 | 10 | 16.0 | 100 | 100 | 98.0 |

All proposed VUI procedures according to embodiments described herein outperformed DTW, a known method in the art. An important observation in Table IV is the influence of the vocabulary size: although learning curves for small vocabulary had a steeper rise, this rise would correspond closely with the rise of the longer curves if learning was evaluated with respect to the number of learning examples per command listed in column five of Table IV.

Example 3

Setup

The adaptive capacity of the procedures was evaluated for changes in user's vocal characteristics. Such changes emerge in users' voices with age or with a progressive disease during their life span. Since the voice recordings are snapshots of two consecutive moments over a time span of one half year resulting in the DOMOTICA-2 and DOMOTICA-3 data sets, we were not able to track this kind of regression in the speaker's voice. Therefore, the utterances of one user were appended to the utterances of another one with the same gender and command list number. The pairs of participants are listed in the first six rows of Table II. All utterances in the appended lists were administered to the learning algorithms as if the utterances were produced by the same user. We investigated which learning procedure was able to adapt to the new vocal characteristics by evaluating the recovery from the user change. For this, we compared adaptive incremental procedures with forgetting factors equal to 0.86 and 0.95. Considering epochs of one utterance, a forgetting factor of 0.985 as depicted in FIG. 1, corresponds with a factor of 0.86 using epochs of 10 utterances.

Results

In FIG. 3, the average F-scores for the end speakers with Pid 28, 30, 35 and 37 of the user pairs are plotted against the first 160 utterances following the user change. The two excluded end users in the graph had less than 160 utterances, nevertheless, their end scores are listed in Table V. The NMF incremental learning procedures are depicted in the left panel whereas the NMF batch learning procedures are depicted in the right panel. The F-scores at the origin correspond with the average ending scores of the users preceding the user change. The drop in performance between 0 and 10 utterances results from the user change. From there, the performance recovers at different rates for different procedures. For all procedures involving incremental learning, two curves with the same markers and colors are depicted with their forgetting factors 0.86 or 0.95 displayed aside. Contrary to the fast learning experiments, the incremental procedures performed better than the batch learning procedures. The full incremental procedure "AI-GMM, AI-NMF", depicted in the left panel by circle-shaped markers, reached the highest score of 89.4% at 160 utterances. The second best procedure was the NMF batch learning procedure backed up with an incremental GMM procedure "AI-GMM, B-NMF", reaching a score of 83.2% at 160 utterances. This curve is depicted in the right panel with five-pointed star markers. Clearly, this procedure had a considerable drop compared with the full incremental procedure. However, some adaptation was achieved through the incremental GMM training procedure as can be seen by the different performances for different forgetting factors $\eta$ in the clustering layer. Overall, when considering the curve pairs of the incremental procedures, the steepest rise is obtained for the curve guided by the strongest forgetting factor. For instance, "CGN-FC, AI-NMF" reached a score of 76% at 100 utterances by using a forgetting factor of 0.86; this score was 12.4% higher than the same procedure using a forgetting factor of 0.95. This relative performance gap was the largest for the "AI-GMM, AI-NMF" procedure with incremental learning at both layers. Note also that procedures using speaker-dependent clusters "SD-FC", performed worse than procedures using CGN-based clusters "CGN-FC". The speaker-dependent training material involved only the preceding speaker.

More detail is presented in Table V. In this table, the end scores of incremental procedures using the stronger forgetting factor are presented together with batch procedures. End scores comparable with the ones in Example 2 are only achieved for the fully adaptive procedure: the "AI-GMM, AI-NMF" with $\gamma$ and $\eta$ equal to 0.86. The end scores of speaker 46.35, 30, 28 and 37 in Table V are approaching the respective end scores in Table IV. Another interesting observation is the overall good performance for all procedures of speaker pairs 43 to 46 and 32 to 35. The training set size of the first speakers counted 123 and 26 utterances, respectively, strongly contrasting the 335 and 322 utterances of the first speakers 34 and 17, respectively. The more utterances prior to the user change, the stronger the priors and the more new utterances needed to unlearn the old models.

TABLE V

Individual F-scores for different procedures using all available data.

| | | F-score (%), $\eta = \gamma = 0.86$ | | | | |
|---|---|---|---|---|---|---|
| list | Pid's | AI-GMM AI-NMF | AI-GMM B-NMF | FC-CGN AI-NMF | FC-CGN B-NMF | DTW |
| 1 | 43→46 | 96 | 93 | 92.5 | 95.5 | 94.0 |
| 2 | 34→41 | 84.9 | 60.1 | 83.6 | 76.7 | 75.2 |
| 4 | 32→35 | 95.1 | 96.5 | 91.1 | 94.1 | 83.8 |
| 5 | 48→30 | 93.9 | 80.2 | 72.8 | 65.6 | 60.4 |
| 6 | 17→28 | 92.3 | 76.3 | 80.7 | 68.9 | 78.1 |
| 8 | 31→37 | 88 | 91 | 86 | 87.5 | 53.5 |

It is shown that incremental learning procedures based on MAP estimation require slightly more training data to achieve the same accuracy than their batch learning variants. MAP estimation at the clustering layer leads to better codebooks than fixed codebooks based on CGN or based on speaker-dependent prior recorded data. It is thus a considerable advantage to use the most recent data for model estimation. A tentative explanation for faster batch learning is that the more data provided as a whole, the more irrelevant features are factored out leading to sparser representations. Whereas batch learning leads to sparser representations, incremental MAP updates keep track of sufficient statistics which are a accumulation of all features: relevant and irrelevant acoustic features that co-occurred with semantic entries that were rather presented in isolation. If this assumption is true, then sparsity inducing priors might improve NMF MAP estimation. This assumption is subject to future research. From the perspective of the targeted application, the small drop in performance should be balanced against memory requirements.

The implementation of incremental MAP estimation on both layers is challenging because changes in the Gaussians require adjustments in the NMF representations in order to achieve proper decoding. The introduced transformation is useful to achieve this goal. If the data is stored or if fixed codebooks are used, the transformation is not required. Only the full incremental procedure operates with this transformation between successive epochs. The incremental procedures demonstrated better adaptation performance than our DTW implementation updating its reference templates online. Exhaustive Bayesian frameworks exists from which a straightforward MAP adaptation procedure could be applied to our GMM and NMF model. Conversely, adaptation in a template based vocal interface is not a straightforward procedure. One of the main advantages of the statistical NMF-based approach is that it parses utterance automatically based on statistical recurrency of the data. The parsing corresponds with the semantic content as it is regularized by the semantic supervision included in the utterance-based input vectors. Utterances are learned as a whole in the DTW procedure. A DTW procedure that learns keywords by segmented input vectors might demonstrate better performances. However, this would require an enrollment phase in which the user provides spoken keyword learning examples to the VUI.

Batch learning procedures learn slightly faster, but the use of incremental procedures is most advantageous if adaptation is required to changes in speech characteristics. It will probably prove to be more robust as well since the acoustic features are learned in the environment of the end user. If forgetting factors are chosen correctly, strong recovery is obtained. The performance levels after recovery in the third experiment approach the performance levels in the second experiment. These procedures outperform the batch learning procedures in a rather compelling way. However, if forgetting factors are improperly chosen, adaptation is suboptimal for small training sets. This finding raises new issues such as the selection of a proper forgetting factor. A dynamic forgetting value that weakens priors to an appropriate extend with regard to changes in user's behavior is a promising direction of future research. More research is also required to find a good detection of possible acoustic changes opposing those such as non-persistent changes caused by a cold to name one example.

Overall, the performance of the incremental procedures are acceptable and feasible for VUI applications dealing with small vocabularies. They outperformed a DTW procedure using six templates per command. Similar to the DTW approach that builds or selects templates from scratch, the full incremental VUI learning approach is, to the best of our knowledge, the first model-based approach that builds its ASR models from preprocessed features such as MFCC features and semantic content. Although NMF batch learning provides slightly faster learning, the rate of adaptation is considerable faster for incremental learning given a proper forgetting factor. Thus if adaptivity is required, if memory is restricted or memory control is needed, then the full incremental procedure is a viable and feasable solution. All its practical advantages make it suitable for many hardware platforms.

All publications and patents mentioned herein are hereby incorporated by reference in their entirety as if each individual publication or patent was specifically and individually indicated to be incorporated by reference. In case of conflict, the present application, including any definitions herein, will control.

While specific embodiments of the subject invention have been discussed, the above specification is illustrative and not restrictive. Many variations of the invention will become apparent to those skilled in the art upon review of this specification and the claims below. The full scope of the invention should be determined by reference to the claims, along with their full scope of equivalents, and the specification, along with such variations.

REFERENCES

[1] G. Hinton et al, "Deep Neural Networks for Acoustic Modeling in Speech Recognition", IEEE Signal Processing Magazine, vol. 29, nr. 6, pp. 82-97, November 2012, url: http://research.microsoft.com/apps/pubs/default.aspx?id=171498.
[2] J. F. Gemmeke et al, "Self-taught assistive vocal interfaces: An overview of the ALADIN project", Proceedings of Interspeech (2013).
[3] J. Driesen, "Discovering words in speech using matrix factorization", PhD Dissertation, July 2012, KU Leuven, ESAT.
[4] B. Ons et al, "Fast vocabulary acquisition in an NMF-based self-learning vocal user interface", Computer Speech & Language, vol. 28, nr. 4, pp. 997-1017 (2014).
[5] J. F. Gemmeke et al, "Dysarthric vocal interfaces with minimal training data", Spoken Language Technology Workshop (SLT) (2014).
[6] M. S. Hawley et al, "A speech-controlled environmental control system for people with severe dysarthria", Medical Engineering & Physics, vol. 29, nr. 5, p. 586-593, Elsevier (2007).
[7] M. S. Hawley et al, "A voice-input voice-output communication aid for people with severe speech impairment", Neural Systems and Rehabilitation Engineering, IEEE Transactions on, vol. 21, nr. 1, p. 23-31 (2013).
[8] Z. Xianglilan et al, "One-against-All Weighted Dynamic Time Warping for Language-Independent and Speaker-Dependent Speech Recognition in Adverse Conditions", PIoS ONE, vol. 9, nr. 2, p. e85458, 02 2014. [Online]. Available: http://dx.doi.org/10.1371%2Fjournal.pone.0085458.
[9] W. H. Abdulla et al, "Cross-words reference template for DTW-based speech recognition systems", in TENCON 2003. Conference on Convergent Technologies for the Asia-Pacific Region, vol. 4, IEEE, 2003, p. 1576-1579.
[10] L. Broekx et al, "Comparing and combining classifiers for self-taught vocal interfaces", Proc SLPAT, p. 21-28, Grenoble, France (2013).
[11] B. Ons et al, "The self-taught vocal interface", EURASIP Journal on Audio, Speech, and Music Processing, vol. 2014, nr. 1, p. 43 (2014). Online: http://asmp.eurasipjournals.com/content/2014/1/43
[12] V. Roy et al, "A Framework for Adaptation of the Active-DTW Classifier for Online Handwritten Character Recognition" 10th International Conference on Document Analysis and Recognition, 2009, ICDAR '09, p. 401-405.
[13] M. Matassoni et al, "The dirha-grid corpus: baseline and tools for multi-room distant speech recognition using distributed microphones", Fifteenth Annual Conference of the International Speech Communication Association, 2014.
[14] B. Lecouteux et al, "Distant speech recognition in a smart home: Comparison of several multisource asrs in realistic conditions", Proc. Interspeech, p. 2273-2276 (2011).
[15] H. Christensen et al, "HomeService: Voice-enabled assistive technology in the home using cloud-based automatic speech recognition", Proc. SLPAT, p. 29-34, Grenoble, France (2013).
[16] H. Van hamme, "HAC-models: a Novel Approach to Continuous Speech Recognition", Proc. Interspeech, Brisbane, Australia, p. 255-258 (2008).
[17] J. Driesen et al, "Adaptive non-negative matrix factorization in a computational model of language acquisition", Proc. Interspeech, Brighton, UK, p. 1711-1714 (2009).
[18] J. Driesen et al, "Modelling vocabulary acquisition, adaptation, and generalization in infants using adaptive Bayesian PLSA", Neurocomputing, vol. 74, p. 1874-1882 (2011).
[19] M. Shashanka et al, "Probabilistic latent variable models as nonnegative factorizations", Computational intelligence and neuroscience, vol. 2008, Hindawi Publishing Corporation (2008).
[20] J. -L. Gauvain et al, "Maximum a posteriori estimation for multivariate Gaussian mixture observations of Markov chains", Speech and audio processing, ieee transactions on, vol. 2, nr. 2, p. 291-298, IEEE (1994).
[21] J. -T. Chien et al, "Adaptive Bayesian Latent Semantic Analysis", Audio, Speech, and Language Processing, IEEE Transactions on, vol. 16, nr. 1, p. 198-207 (January 2008).
[22] A. P. Dempster et al, "Maximum likelihood from incomplete data via the EM algorithm", Journal of the Royal Statistical Society. Series B (Methodological), p. 1-38 (1977).

[23] T. Hofmann, "Probabilistic latent semantic analysis", Proceedings of the Fifteenth conference on Uncertainty in artificial intelligence, p. 289-296, Morgan Kaufmann Publishers Inc. (1999).
[24] B. Ons et al, "NMF-based keyword learning from scarce data", in Proc Automatic Speech Recognition and Understanding (ASRU), 2013 IEEE Workshop on, p. 392-397, IEEE (2013).
[25] B. Ons et al, "A Self Learning Vocal Interface for Speech-impaired Users", in SLPAT 2013, pp. 1-9 (2013).
[26] C. Middag, "Automatic Analysis of Pathological Speech", PhD Dissertation, Ghent University, Belgium (2012).
[27] M. Ferrarons et al, "Flexible Stand-Alone Keyword Recognition Application Using Dynamic Time Warping", Advances in Speech and Language Technologies for Iberian Languages, p. 158-167, Springer (2014).
[28] N. Oostdijk, "The Spoken Dutch Corpus. Overview and first Evaluation.", In Proc. LREC, Genoa, Italy (2000).
[29] "A Self Learning Vocal Interface for Speech-impaired Users" also includes the grammar learning.
[30] "The self-taught vocal interface" also includes grammar learning.
[31] "Modelling vocabulary acquisition, adaptation and generalization in infants using adaptive Bayesian PLSA".
[32] "Integration of Asynchronous Knowledge Sources in a Novel Speech Recognition Framework."
[33] "A Computational Model of Language Acquisition: the Emergence of Words".
[34] "Phonetic Analysis of a Computational Model for Vocabulary Acquisition from Auditory Inputs".
[35] "Discovering Phone Patterns in Spoken Utterances by Non-Negative Matrix Factorization"
[36] "HAC-models: a Novel Approach to Continuous Speech Recognition", ICSLP2008.
[37] "Fast vocabulary acquisition in an NMF-based self-learning vocal user interface".

The invention claimed is:

1. A method of processing and/or recognizing voice or speech acoustic signals by a computer processor, the method comprising:
incrementally learning and/or adapting at least one of a clustering model or a latent variable model by associating input acoustic signals with input semantic frames to learn vocabulary, commands and generate adaptive changes in the acoustic signals without impairing previous knowledge defined by at least one of the clustering model or the latent variable model;
generating a semantic frame from an input voice or speech acoustic signal using one or more of at least one of the clustering model or the latent variable model;
mapping the semantic frame to a predetermined action; and
performing the predefined action when the mapping is successful.

2. The method of claim 1, wherein the semantic frames are generated from user actions performed on an alternate non-vocal user interface.

3. The method of claim 2, wherein the alternative non-vocal user interface includes any one or more of buttons, a keyboard, a mouse with associated graphical user interface (GUI).

4. The method of claim 2, wherein semantic concepts are relevant semantics that a user refers to when controlling or addressing a device or object or a connected device or object by voice using a vocal user interface (VUI).

5. The method of claim 4, wherein the semantic frame is generated by processing the input acoustic signal to extract acoustic features and performing histogram of acoustic co-occurrence (HAC) processing to generate an HAC vector, the HAC vector being processed with one or more latent variable layers to generate a semantic vector to be processed according to a semantic frame structure.

6. The method of claim 4, wherein the semantic concepts are predefined and a vector, wherein the vector is composed of entries which represent the presence or absence of a vocal expression referring to one of the predefined semantic concepts.

7. The method of claim 6, wherein the vector is a fixed length vector.

8. The method of claim 4, wherein the incremental learning is applied to one or more of a clustering layer and a latent variable layer.

9. The method of claim 8, wherein in the clustering layer either a Gaussian mixture model (GMM), a deep neural network (DNN), convolutional neural network (CNN) or a recurrent neural network (RNN) is trained incrementally.

10. The method of claim 8, wherein in the latent variable layer comprises incremental non-negative matrix factorization (NMF) learning that associates a histogram of acoustic occurrence (HAC) features in the utterances to the semantics is trained incrementally.

11. The method of claim 4 wherein the incremental learning is achieved through maximum a posteriori (MAP) estimation.

12. The method of claim 11, wherein a forgetting factor is included in both the clustering layer and latent variable layer to remove any less frequently used vocabulary terms.

13. The method of claim 12, further comprising anticipating an effect of adapting the clustering layer on latent variable layer parameters.

14. The method of claim 13, wherein anticipating the effect of adapting the clustering layer comprises adapting the GMM or DNN, adapting the latent variable layer parameters for NWF or NN, and performing model smoothing.

15. The method of claim 1, wherein the semantic frames are generated from automatically analyzing text associated with vocal commands.

16. The method of claim 1, where performing action further comprises sending the action command to another system or device.

17. The method of claim 1, where incremental learning comprises adding new vocabulary or speech related knowledge or recognition capabilities to at least one of a clustering model or a latent variable model only from the new data while retaining old capabilities but without requiring any old data.

18. A non-transitory computer readable medium comprising computer executable instructions for processing and/or recognizing voice or speech acoustic signals, the instruction when executed by the processor performing:
incrementally learning and/or adapting at least one of a clustering model or a latent variable model by associating input acoustic signals with input semantic frames to learn vocabulary, commands and generate adaptive changes in the acoustic signals without impairing previous knowledge defined by at least one of the clustering model or the latent variable model;
generating a semantic frame from an input voice or speech acoustic signal using one or more of at least one of the clustering model or the latent variable model;
mapping the semantic frame to a predetermined action; and performing the predefined action when the mapping is successful.

19. A system for processing voice or speech acoustic signals, the system comprising:
- a memory containing at least one model; and
- a processor for receiving a voice or speed acoustic signal, the processor incrementally learning and/or adapting the at least one of a clustering model or a latent variable model by associating input acoustic signals with input semantic frames to learn vocabulary, commands and generate adaptive changes in the acoustic signals without impairing previous knowledge defined by the at least one of the clustering model or the latent variable model wherein the processor generates a semantic frame from the received voice or speech acoustic signal using one or more of at least one of the clustering model or the latent variable model which is mapped to a predetermined action that can be performed when the mapping is successful.

20. The system of claim 19, wherein the system comprises a cloud-based device for performing cloud-based processing.

21. The system of claim 19, wherein the system is an electronic device comprising an acoustic sensor for receiving acoustic signals.

* * * * *